United States Patent
Xiao

(10) Patent No.: US 8,706,292 B2
(45) Date of Patent: Apr. 22, 2014

(54) APPARATUS FOR RECEIVING AND DISPENSING CARDS AUTOMATICALLY

(75) Inventor: Qing Xiao, Shenzhen (CN)

(73) Assignee: IME Electronics Co., Ltd., Shenzhen (CN)

( * ) Notice: Subject to any disclaimer, the term of this patent is extended or adjusted under 35 U.S.C. 154(b) by 0 days.

(21) Appl. No.: 13/202,159

(22) PCT Filed: Feb. 9, 2010

(86) PCT No.: PCT/CN2010/070585
§ 371 (c)(1),
(2), (4) Date: Aug. 18, 2011

(87) PCT Pub. No.: WO2010/094230
PCT Pub. Date: Aug. 26, 2010

(65) Prior Publication Data
US 2011/0301750 A1 Dec. 8, 2011

(30) Foreign Application Priority Data
Feb. 20, 2009 (CN) .......................... 2009 1 0105399

(51) Int. Cl.
*G06F 17/00* (2006.01)
*B65D 83/08* (2006.01)
*B65G 59/00* (2006.01)

(52) U.S. Cl.
USPC ............................ 700/237; 221/154; 221/97

(58) Field of Classification Search
USPC ..................... 700/237; 221/97, 154
See application file for complete search history.

(56) References Cited

U.S. PATENT DOCUMENTS

| 4,789,079 | A | 12/1988 | Kobayashi et al. |
| 5,753,897 | A * | 5/1998 | Kasper .......................... 235/380 |
| 6,311,867 | B1 | 11/2001 | Yamamiya |
| 6,827,261 | B2 | 12/2004 | Abe et al. |
| 6,957,746 | B2 | 10/2005 | Martin et al. |
| 7,980,420 | B2 * | 7/2011 | Yamamiya .................... 221/268 |

FOREIGN PATENT DOCUMENTS

| CN | 2491903 Y | 5/2002 |
| CN | 1510636 A | 7/2004 |
| CN | 2638152 Y | 9/2004 |
| CN | 101488254 A | 7/2009 |
| CN | 201322947 Y | 10/2009 |
| CN | 201364598 Y | 12/2009 |

OTHER PUBLICATIONS

International Search Report, PCT/CN2010/070585, dated May 20, 2010.

* cited by examiner

*Primary Examiner* — Michael K Collins

(57) ABSTRACT

An apparatus for receiving and dispensing cards automatically includes a card receiving and dispensing main body (1000) and a card dispensing box (1001) removably installed on said main body (1000). Said card dispensing box (1001) includes a card dispensing box body, a card outlet (141) and a card gate (90) configured on said card dispensing box body. Said card dispensing box (1001) also includes a card gate locking device for controlling the opening and closing of said card gate (90). Said apparatus also includes an identification and unclocking device, which controls the activity of the card gate locking device on the card dispensing box (1001) associated with the card receiving and dispensing main body (1000) to open the card gate (90) of the card dispensing box (1001).

17 Claims, 19 Drawing Sheets

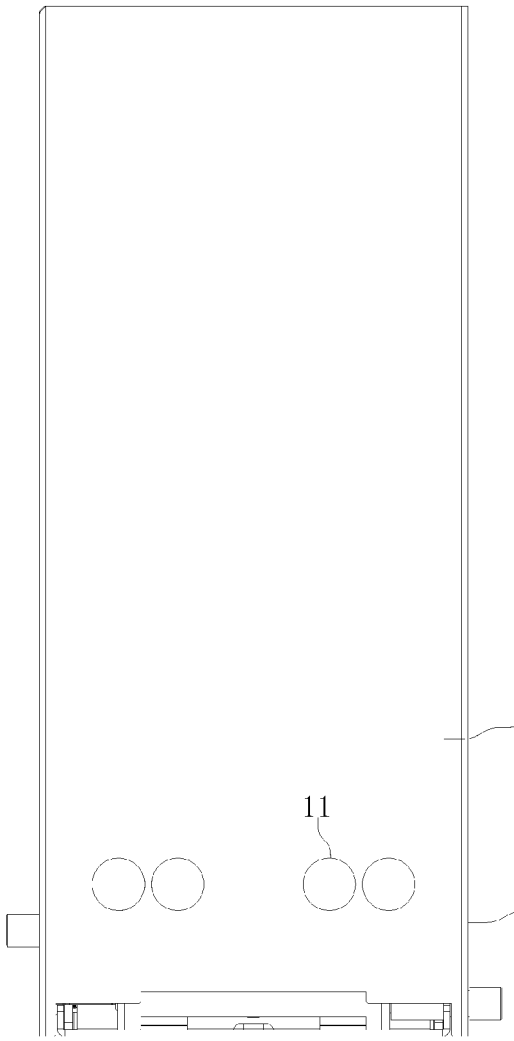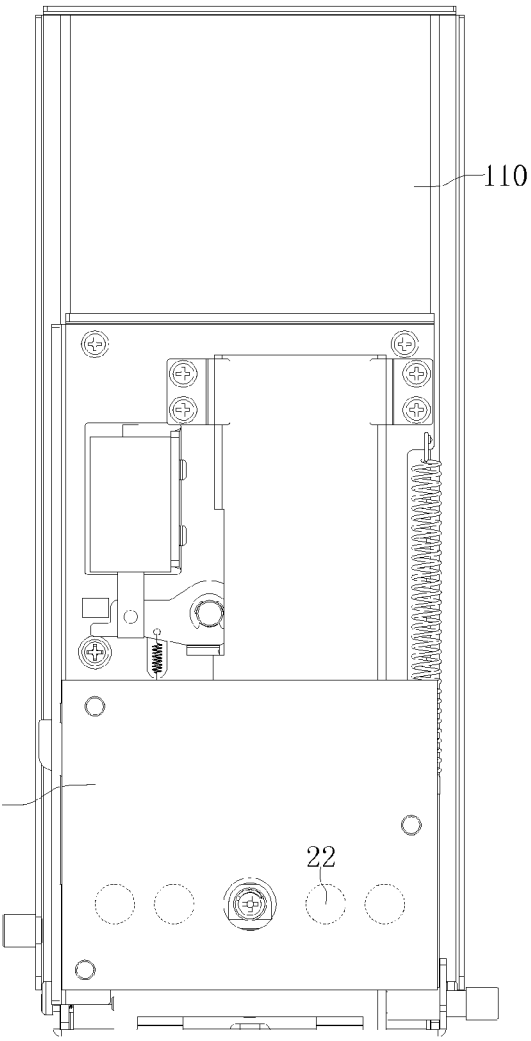
FIG. 7
FIG. 8

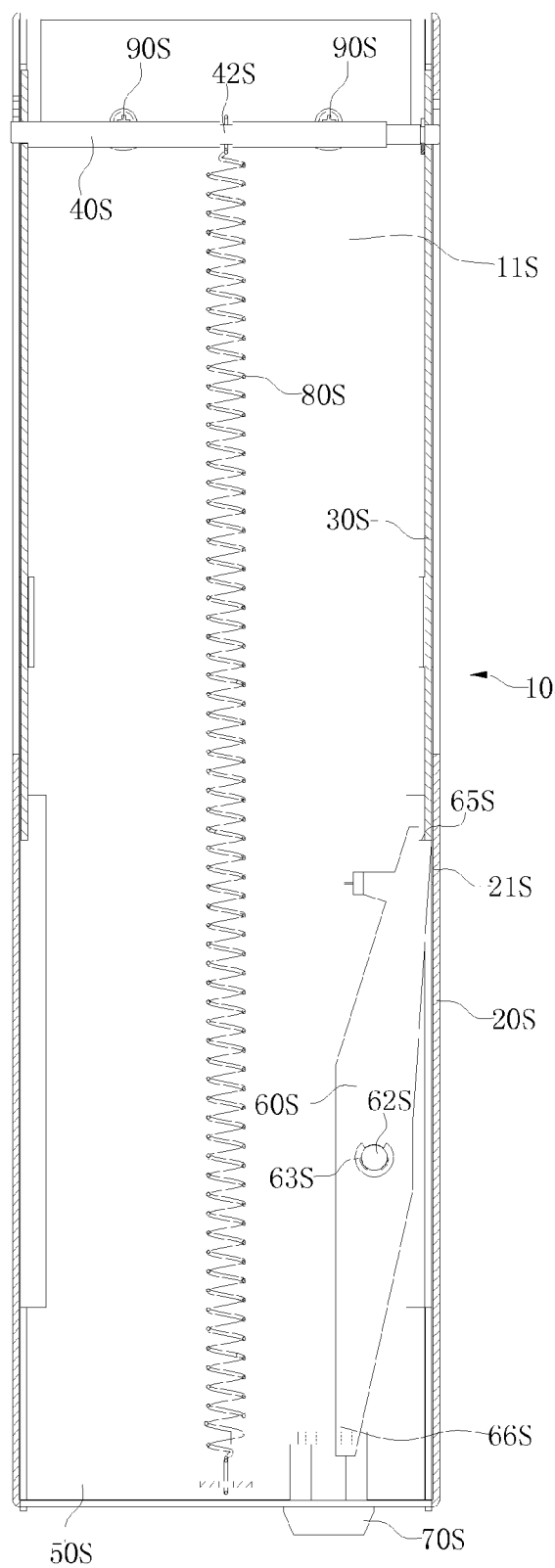
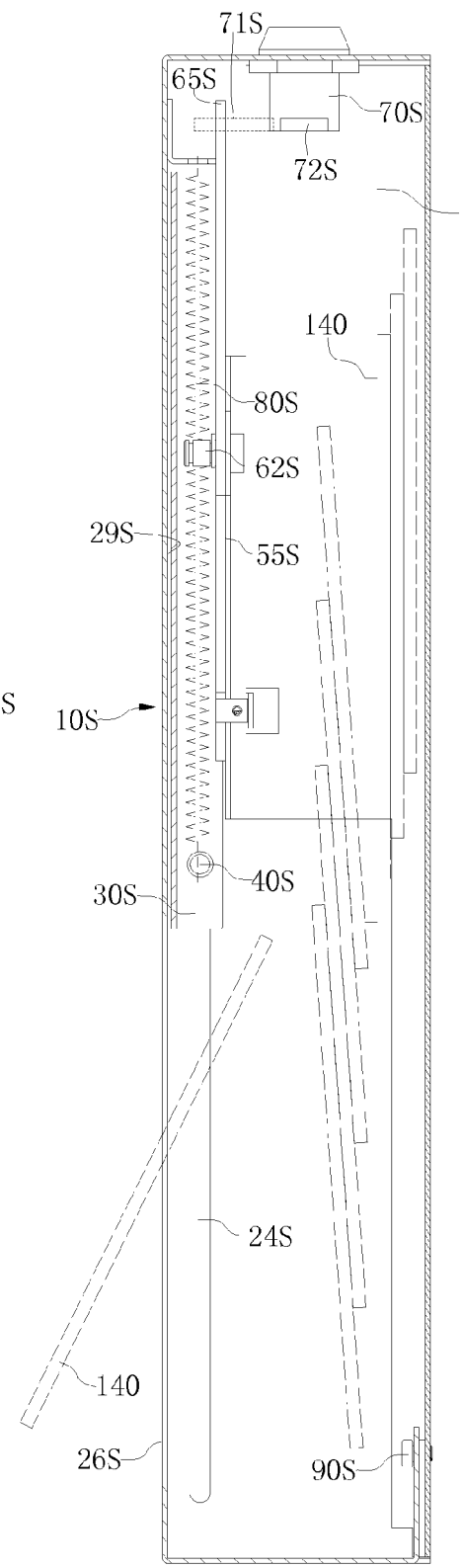
FIG. 14
FIG. 15

US 8,706,292 B2

APPARATUS FOR RECEIVING AND DISPENSING CARDS AUTOMATICALLY

CROSS REFERENCE TO RELATED APPLICATIONS

The present application is a national phase entry under 35 U.S.C. §371 of International Application No. PCT/CN2010/070585 filed Feb. 9, 2010, published in Chinese, which claims priority from Chinese Patent Application No. 200910105399.9, filed Feb. 20, 2009, the entire disclosures of which applications are incorporated herein by reference.

FIELD OF THE INVENTION

The invention relates to an apparatus for receiving and dispensing cards, and more particularly relates to a safe and reliable automatic card receiving and dispensing apparatus.

BACKGROUND OF THE INVENTION

At present, card dispensers on the market have a storehouse for accommodating cards. For example, a card dispenser from Sankyo Company of Japan is provided with a card stack region at the end of the dispenser. When the system has detected card shortage, it is necessary for the staff to go to the spot to supplement cards. Though the structure of such apparatus is simple and reliable and it is convenient for loading cards, it is possible that the cards may be lost or be removed artificially during manually loading, moving and handling the cards. The card dispenser from Omron Corporation of Japan has solved the probable situations described above to a certain degree, wherein, the card dispenser is provided with a card box at the end that may be removed from the card dispenser. The separate card box is utilized for loading cards, which may facilitate management. However, it has a lack of security, because the cards in the card box may be taken out by ones without authority.

The existing card box is generally mounted directly in the card dispenser main body. A card gate of the card outlet of the card box is not under protection. In other words, the card outlet may be opened at any time, such that the cards in the card box may be removed easily. Moreover, there is no correspondence between the card box and the card dispenser main body. The card box may be mounted on different card dispenser main bodies for dispensing cards. This also has disadvantages of lack of supervision and being not to ensure security of the cards.

A card box for loading cards as mentioned in U.S. Pat. No. 4,789,079 is added with a card pressing spring in the interior whereof, so as to ensure that the cards may not turn over due to sloshing of the card box after the card box has been removed from the card dispenser. But the card box does not have any security settings. Although locking means is equipped outside the card box, the card outlet is not under protection, but just a rotatable barrier is provided to close the card outlet. Thus, it is just needed to push the barrier aside gently by hand, then any person that can access to the card box can take out the cards loaded or left in the card box through the card outlet.

Additionally, usually when a user does not take away the card already being dispensed or cards are in an anomalous situation, the card dispenser may automatically withdraw the card and then the card may enter a card receiving box. For the existing card dispenser products, the card receiving box is generally a cavity arranged in the card dispenser for receiving cards, wherein the cards may be removed by specialized staff by hand. Such common method of receiving cards may be referred to a card receiving unit as mentioned in U.S. Pat. No. 6,827,261, which is irregular and unreasonable for financial system requiring high security and strict management. The cards placed in such card receiving unit may be taken out easily by an unspecified staff illegally. Especially in the financial system, cards are equivalent to effective securities, so various aspects associated with the cards must be in strict control.

In a card dispenser as mentioned in U.S. Pat. No. 6,311,867, the cards in the card dispensing box is sealed by means of locks, and the cards may be driven from bottom up to the card dispensing portion by way of a elevator, and then the card may be dispensed by the card dispenser. A disadvantage of this card dispenser is that it is not convenient to handle and manage the cards in the card dispenser. Onsite operation is required during supplementing cards to the card dispenser. Furthermore, it may take a long time to fill the cavity storing cards on the spot. In actual operation, the card dispenser is often arranged in a narrow area. It is unreasonable to working in the area for a long time. Similarly, it is possible for cards to be lost or be removed artificially during manually loading, moving and handling the cards.

SUMMARY OF THE INVENTION

An objective of this invention is to overcome the disadvantage of lack of security for the card dispensers in the prior art and to provide an apparatus for receiving and dispensing cards automatically with installation protection to ensure security of cards therein.

A technical solution utilized in this invention to solve its technical problem is: an apparatus for receiving and dispensing cards automatically is provided, including a card receiving and dispensing main body and a card dispensing box removably installed on said main body; said card dispensing box includes a card dispensing box body, a card outlet and a card shutter configured on said card dispensing box body; said card dispensing box also includes a card shutter locking device for controlling opening and closing of said card shutter; said apparatus also includes an identification and unlocking device, which controls action of the card shutter locking device on the card dispensing box matched with the card receiving and dispensing main body so as to open the card shutter of the card dispensing box.

This invention has following advantageous effects: by an identification and unlocking device controlling the activity of the card shutter locking device on the card dispensing box associated with the card receiving and dispensing main body to open the card shutter of the card dispensing box, there existing a unique correspondence between the card dispensing box and the card receiving and dispensing main body, so as to prevent the card dispensing box from being controlled and used by other card receiving and dispensing main bodies, such that management and control to the card dispensing box is optimized. Furthermore, since the opening of the card shutter locking device is controlled by the identification and unlocking device, if the card dispensing box is not matched with the apparatus for receiving and dispensing cards, the card shutter locking device can not be opened, so as to ensure security of the cards in the card dispensing box.

BRIEF DESCRIPTION OF THE DRAWINGS

FIG. 7 is a front view of the card dispensing box 1001 of the apparatus for receiving and dispensing cards automatically according to the present invention;

FIG. 8 is a front view of the card dispensing box shown in FIG. 7 with a box cover 10 being removed;

FIG. 14 is a cutaway view taken along a section line C-C in FIG. 13;

FIG. 15 is a cutaway view taken along a section line D-D in FIG. 13;

DETAILED DESCRIPTION OF THE PREFERRED EMBODIMENT

Figure 1:
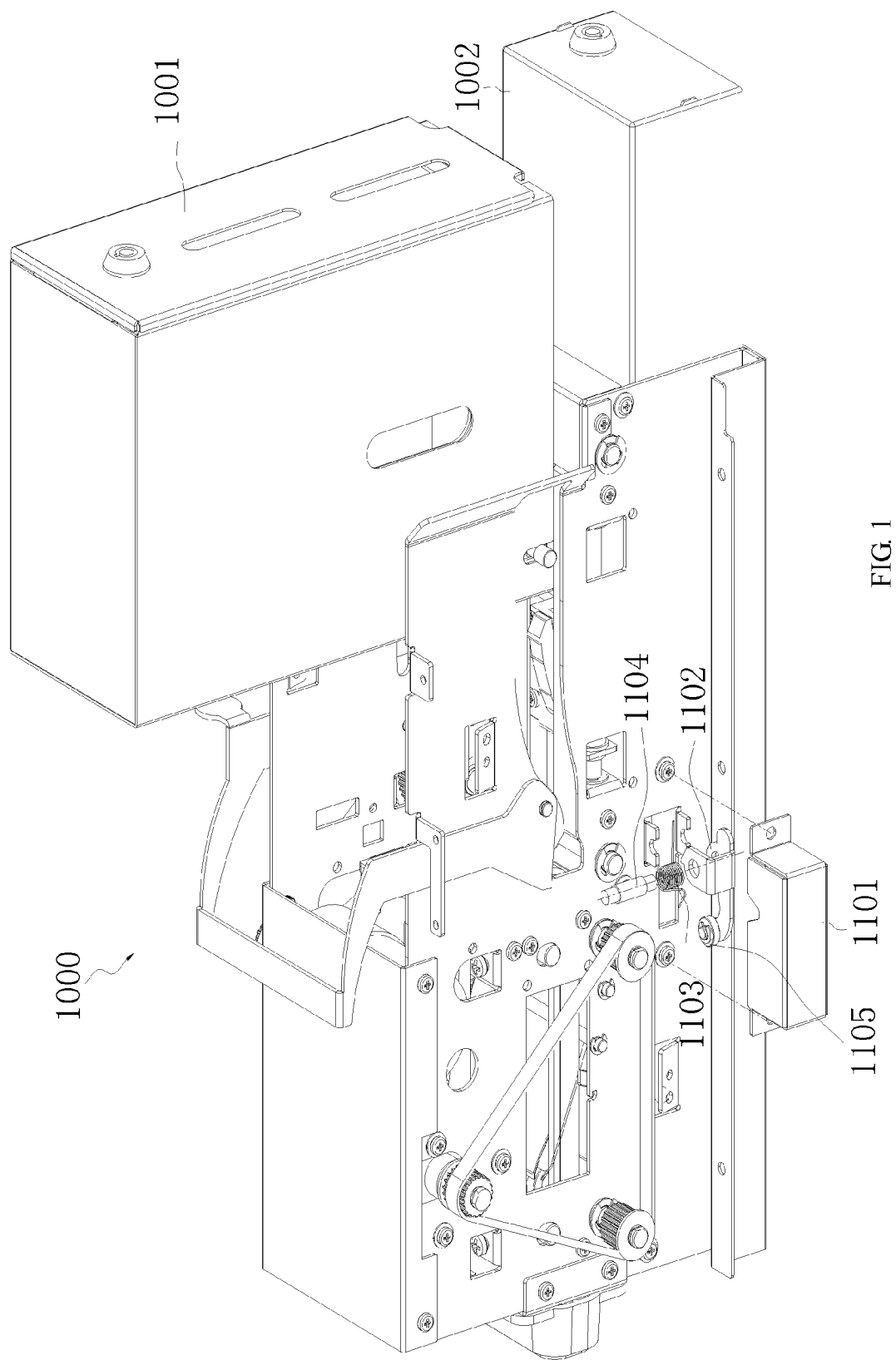
FIG. 1 is a perspective view of an apparatus for receiving and dispensing cards automatically according to the present invention.

An apparatus for receiving and dispensing cards automatically according to a specific embodiment of the present inventions shown in FIG. 1 to FIG. 21. The apparatus for receiving and dispensing cards automatically includes a card receiving and dispensing main body, a card dispensing box removably installed on said main body, and an identification and unlocking device. Said card dispensing box includes a card dispensing box body, a card outlet and a card shutter configured on said card dispensing box body, and a card shutter locking device for controlling said card shutter to open and close the card outlet. Said identification and unlocking device controls action of the card shutter locking device on the card dispensing box matched with the card receiving and dispensing main body so as to open the card shutter of the card dispensing box.

In the present embodiment, the card shutter locking device is an electronic-controlled device and comprises a card shutter locking mechanism for controlling opening and locking of the card shutter, and an electric unlocking mechanism 40 for triggering action of the card shutter locking mechanism. The electric unlocking mechanism 40 may be selected from electromagnet, motor etc., for triggering and driving the card shutter locking mechanism acting. The card shutter locking mechanism is only needed to be able to drive the card shutter 90 to move up and down for opening and locking the card outlet 141, of course, it is best to be provided with self-locking function, so as to improve security. The details will be described in the following.

The identification and unlocking device is also an electronic-controlled device and comprises a conductive mechanism and a communication mechanism arranged on the card receiving and dispensing main body and the card dispensing box, a memory arranged on the card dispensing box for storing identification information, and a controller arranged on the card receiving and dispensing main body. In the present embodiment, the card receiving and dispensing main body and the card dispensing box are provided with a circuit board therein, respectively. The conductive mechanism is a conductive contact or a connector arranged on the card receiving and dispensing main body and the card dispensing box, respectively. For example, a flexible probe is utilized for connecting; wherein, the flexible probe is fixed on the card receiving and dispensing main body and electrically connected with a motherboard of the card receiving and dispensing main body; the other end of the flexible probe touches the contacts 22 on the card dispensing box. There are four contacts, i.e., a power cord, a ground and two communication lines. The two communication lines may be implemented by wireless communication, such as radio communication or infrared communication.

When the card dispensing box is positioned in the card receiving and dispensing main body, the conductive mechanism is connected to supply power to the card dispensing box.

It should be noted that built-in power supply may be arranged in the card dispensing box. When the card dispensing box is positioned in the card receiving and dispensing main body, just turn on the power supply. A~th e card dispensing box is power on, communication is established between the card receiving and dispensing main body and the card dispensing box by the communication mechanism, such as by a contact-based connector, non-contact infrared and Bluetooth communications etc. The controller on the card receiving and dispensing main body sends a signal requesting identification information of the card dispensing box, and the card dispensing box returns a response. The controller identifies the identification information in the response. If the identification information in the response does not match, the electric unlocking mechanism of the card dispensing box does not work, and the card shutter can not be opened. If the identification information in the response matches with the card receiving and dispensing main body, the controller sends a control signal to control the electric unlocking mechanism acting, so as to trigger and control the card shutter locking mechanism to open the card shutter, and enters a state of waiting for dispensing cards.

Figure 21:
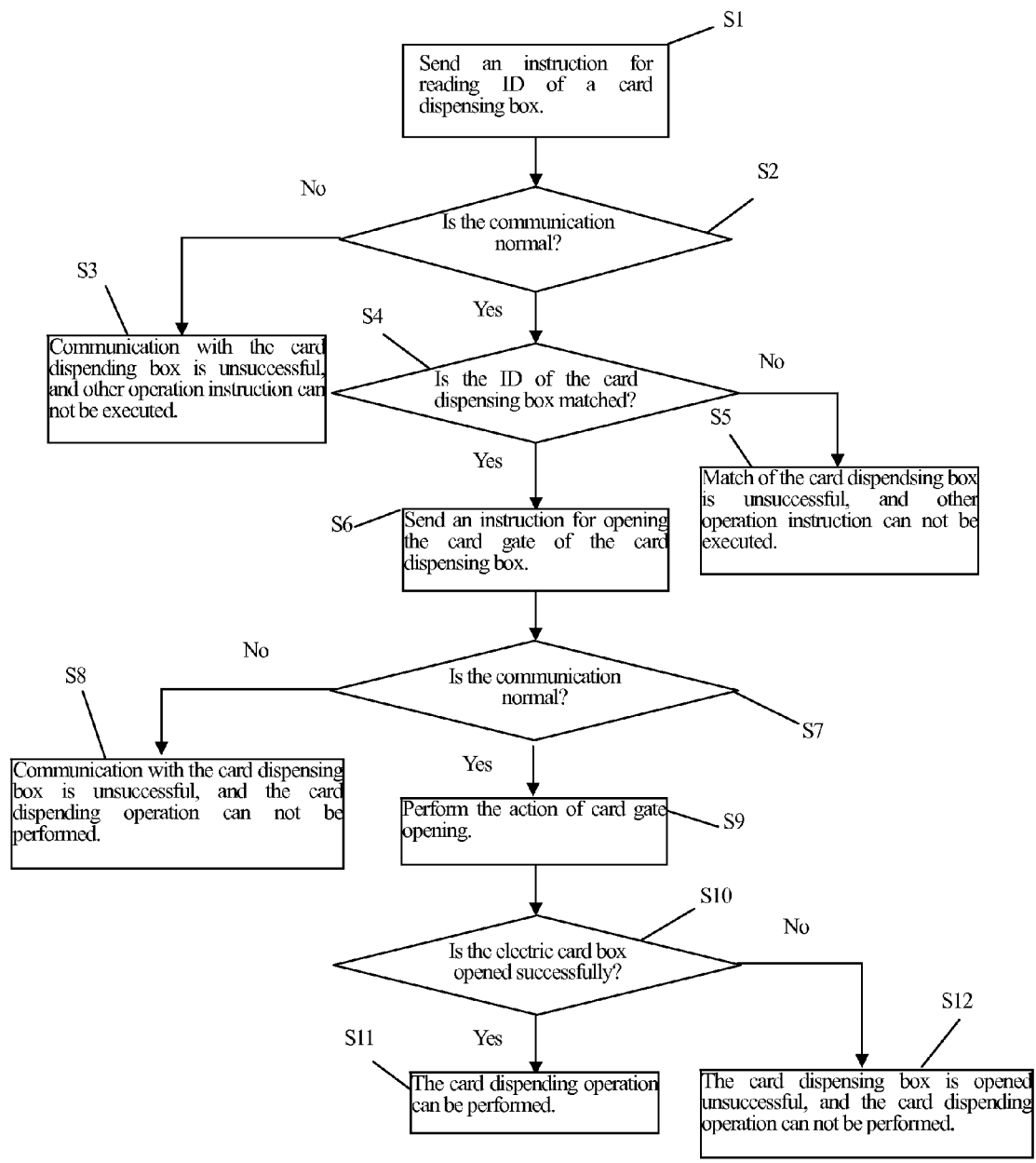
FIG. 21 is a flow chart for determining opening of the card shutter of the apparatus for receiving and dispensing cards automatically according to the present invention.

Referring to FIG. 21, a workflow for identification and confirmation of the card receiving and dispensing main body and the card dispensing box is shown. Firstly, the card dispensing box is inserted in the card receiving and dispensing main body and power on. Then, the card receiving and dispensing main body sends an instruction for reading an ID of the card dispensing box to the card dispensing box (S1), and determines whether the communication is normal (S2); if the communication is abnormal (such as being unable to communicate, or being interrupted), an alarm by voice or display etc. is generated, indicating the communication with the card dispensing box is unsuccessful and other instructions can not be executed (S3); If the communication is normal, whether the ID of the card dispensing box matches is determined (S4), for example, by comparing the read ID of the card dispensing box with a pre-stored ID in the card receiving and dispensing main body; If the ID of the card dispensing box is not matched, an alarm by voice or display etc. is generated, and other instructions can not be executed (S5). If the ID of the card dispensing box is matched successfully, the card receiving and dispensing main body sends an opening instruction (S6) and determine whether the communication is normal (S7); If the communication is abnormal (such as being unable to communicate, or being interrupted), an alarm by voice or display etc. is generated, indicating the communication with the card dispensing box is unsuccessful and other instructions cannot be executed (S8); If the communication is normal, the electric unlocking mechanism is controlled to act so as to open the card shutter (S9).

Further, the apparatus for receiving and dispensing cards automatically is also provided with a detection device for detecting whether the card shutter is opened successfully (S 10). The detection device may be a light sensor or a position sensor, etc. When the card shutter is detected to be opened successfully, the card receiving and dispensing main body may perform operation of dispensing cards (S11), otherwise, it can not perform the operation of dispensing cards (S 12).

Figure 22:
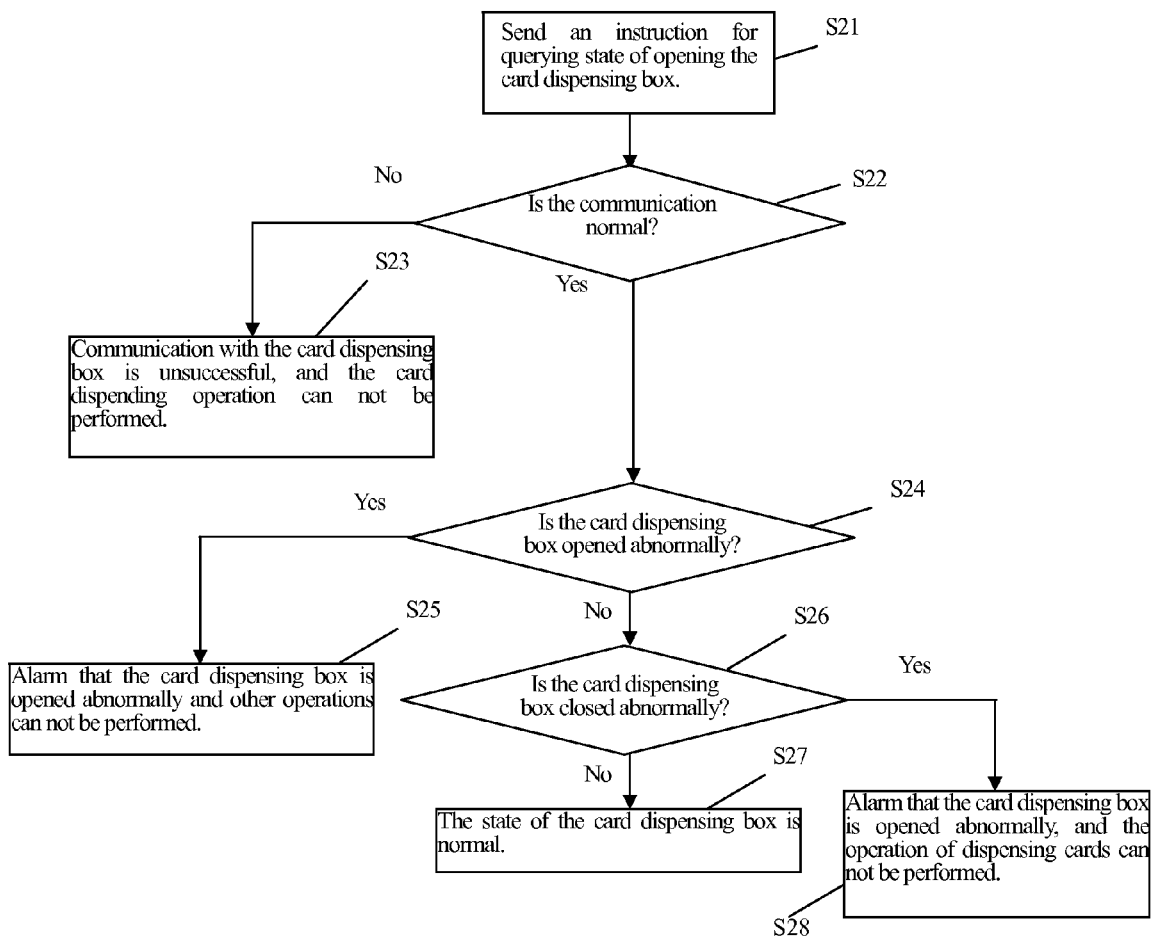
FIG. 22 is a flow chart for querying state of the card shutter of the apparatus for receiving and dispensing cards automatically according to the present invention.

Further, the apparatus for receiving and dispensing cards automatically is also provided with a memory for recording state of the card dispensing box automatically, which is used to record the state of the card shutter of the card dispending box, and a workflow thereof is shown in FIG. 22. Firstly, the card receiving and dispensing main body sends an instruction for querying a state of opening the card dispensing box (S21), and examine whether the communication is normal (S22); if the communication is abnormal, an alarm by voice or display etc. is generated to point out that the communication with the card dispensing box is abnormal and the card dispensing box is unable to perform the operation of dispensing cards (S23); If the communication is normal, whether the card shutter of the card dispensing box being opened abnormally is determined based on the state of the card shutter of the card dispensing box recorded in the memory for recording state of the card dispensing box of the card receiving and dispensing main body (S24); If the recorded state presents that the card shutter of the card dispensing box is opened abnormally, an alarm is sent and the operation of dispensing cards is unable to be implemented (S25); If the recorded state presents that the card shutter of the card dispensing box is opened normally, it is determined whether the card shutter of the card dispensing box is closed abnormally (S26); If the recorded state presents that the card shutter of the card dispensing box is closed abnormally, the operation of dispensing cards is unable to be implemented (S28); otherwise, the state of the card dispensing box is normal, and other operations can be implemented (S27).

Figure 18:
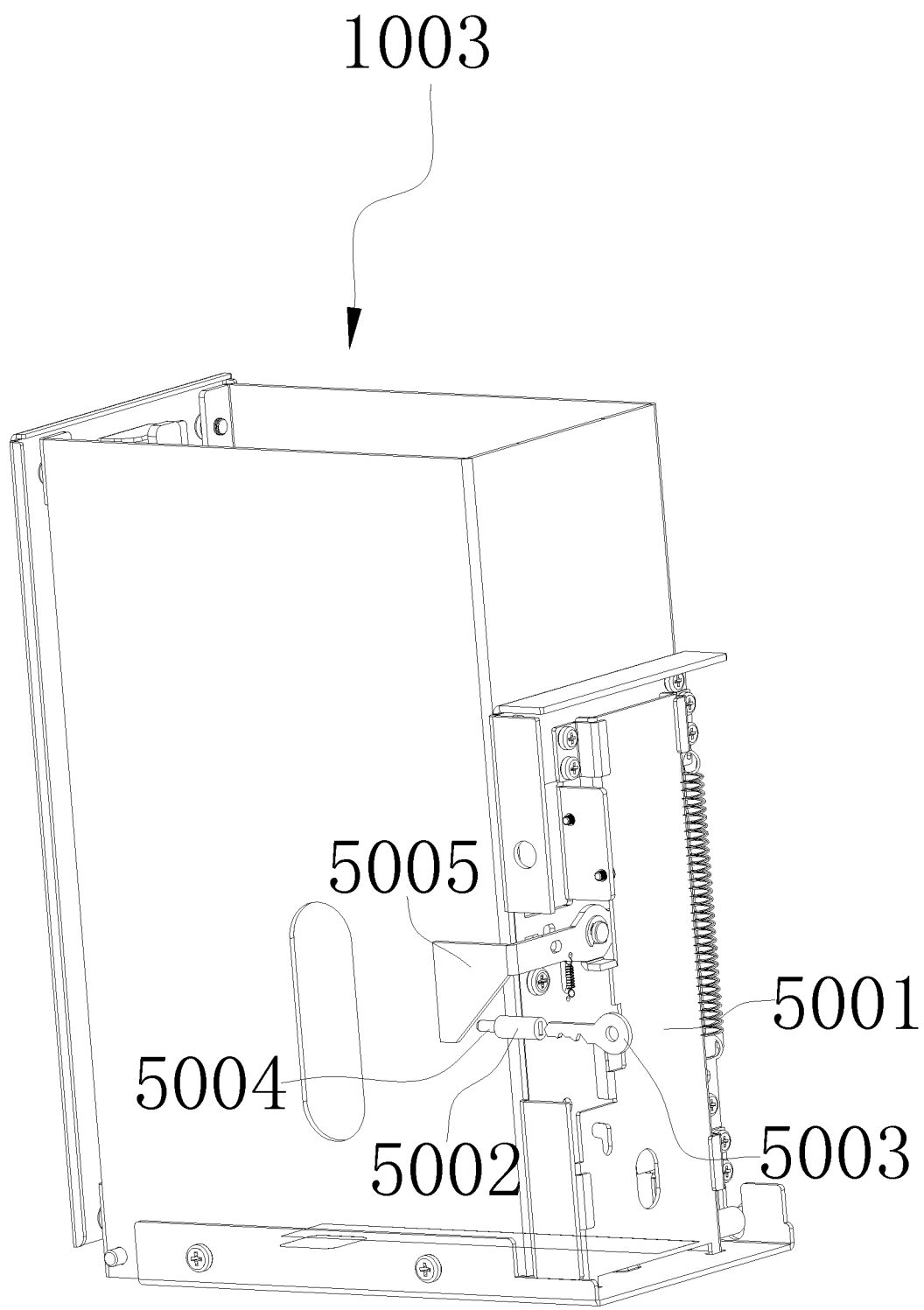
FIG. 18 is a view of a card dispensing box 1003 of the apparatus for receiving and dispensing cards automatically according to another embodiment of the present invention.

As shown in FIG. 18, in another embodiment of the present invention, the card shutter locking device comprises a card shutter locking mechanism for controlling the opening and locking of the card shutter, and a mechanical unlocking mechanism for triggering the action of the card shutter locking mechanism. The identification and unlocking device utilizes a key and a lock cylinder mounted on the card receiving and dispensing main body and the card dispensing box, respectively. After the card dispensing box is arranged in the card receiving and dispensing main body, if the key matches the lock cylinder, the key 5003 is inserted into a keyhole of the lock cylinder 5002 to push the lock cylinder. An end protrusion 5004 of the lock cylinder 5002 begins to move to trigger a self-locking linkage 5005 to turn around, then the mechanism is unlocked and the card shutter 5001 is opened. If an improper key is utilized, the end protrusion 5004 of the lock cylinder 5002 may not move, and the mechanism is still in the locking state. The card shutter is unable to be opened.

Figure 6:
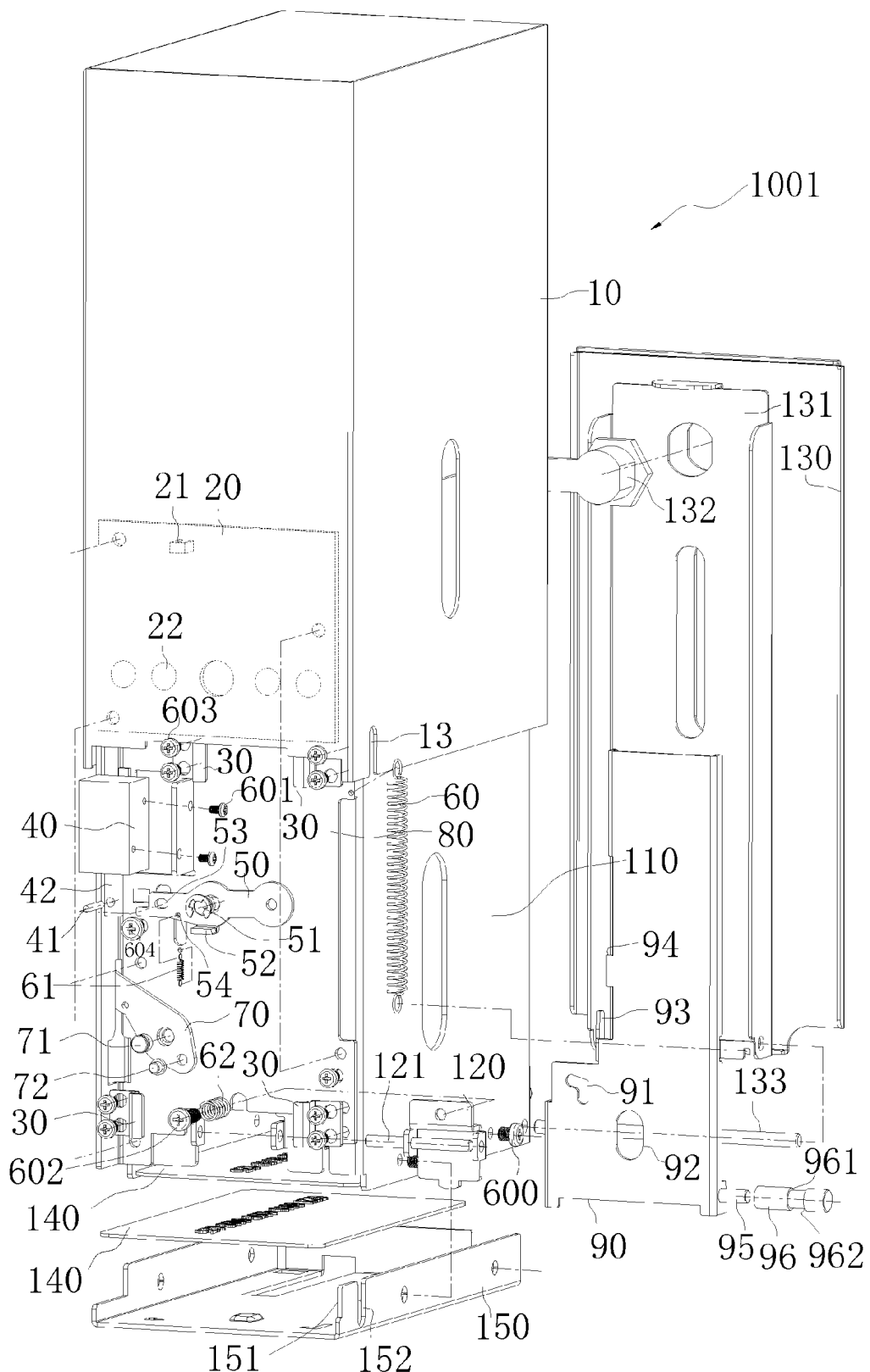
FIG. 6 is an exploded view of a card dispensing box 1001 of the apparatus for receiving and dispensing cards automatically according to the present invention.

In the two embodiments described above, similar structure may be utilized to implement the card shutter locking mechanism. An embodiment in which the card dispensing box is provided with a card locking mechanism is shown in FIG. 6. Specifically, the card 140 stack region is positioned in a cavity formed by an assembly of a box wall 110, a box base 150, a box outer gate 130, a box inner gate 131 and a box cover 10. The box base 150 is connected to the box wall 110 by means of screws 600. The box outer gate 130 and the box inner gate 131 constitute a box gate which is connected to the box wall by a spindle 133 and rotates around the spindle 133. The box gate is positioned at a side of the box body. The box gate is connected to the box body by means of a cam lock 132. An interlayer is formed between the box wall 110 and the box cover 10. Accessories for implementing the main functions of the present invention are all arranged on a panel 80 and also in the interlayer.

The card shutter locking mechanism for opening or locking the card shutter is mounted on the panel 80. An electromagnet 40 used as the electric unlocking mechanism is fixed on the panel 80 by means of screws 601. An output of the electromagnet 40 is connected to a pull rod 42 through which a pin 41 is positioned. The other endnote pin41 is positioned through a pin hole 53 on the self-locking linkage 50. The pull rod 42 is driven by the electromagnet 40 and the self-locking linkage 50 is driven to rotate by the pin 41. The self-locking linkage 50 may rotate around a shaft 51 which is riveted on the panel 80. The shaft 51 is just a constraint for the self-locking linkage. The self-locking linkage 50 has only a degree of freedom of turning around the shaft 51.

Thus, after the electromagnet 40 is power on, the pull rod 42 begins to act to drive the self-locking linkage 50 to turn around clockwise via the pin 41. One end of a reset spring 61 hangs in a hole 54 of the self-locking linkage 50, and the other end hangs on the panel 80. The pull of the reset spring 61 makes the self-locking linkage 50 has a tendency to turn around counterclockwise. After the electromagnet 40 is power off, the self-locking linkage 50 resets by the pull of the reset spring 61. It is shown that the card shutter 90 slides straightly along a linear guide constituted of a side rail 30 and the panel 80, wherein the side rail 30 is fixed on the panel 80 by means of screws 603. Four side rails as shown may constraint five degrees of freedom of the card shutter 90. The linear guide is a constraint for the card shutter.

A barrier 93 on the card shutter 90 is utilized to trigger a sensor 21 mounted on the circuit board 20. The sensor 21 is generally an interruptible photoelectric sensor or a mechanical switch triggered sensor for detecting the opening and closing of the card shutter, so as to record the opening and closing states of the card shutter 90 which may be stored in the memory in order to enable monitoring the state of the card shutter 90, and a querying flow thereof is shown in FIG. 21. An end surface of a locking end 94 on the card shutter may contact with or slide away from a locking end 52 of the self-locking linkage 50, so as to enable the opening or closing of the card shutter 90 to close or open the card outlet 141.

Now referring to FIG. 7 and FIG. 8, the box cover 10 is provided with four circular holes 11 on the front side. A contact 22 or a banana jack is positioned on the corresponding position directly opposite to each circular hole on the circuit board 20 for electrically connecting the corresponding probe or banana plug on the card receiving and dispensing main body in a separable manner. The card receiving and dispensing main body may communicate with or supply operating voltage to the card dispensing box via the contact 22 or the banana jack.

Figures 9, 10:
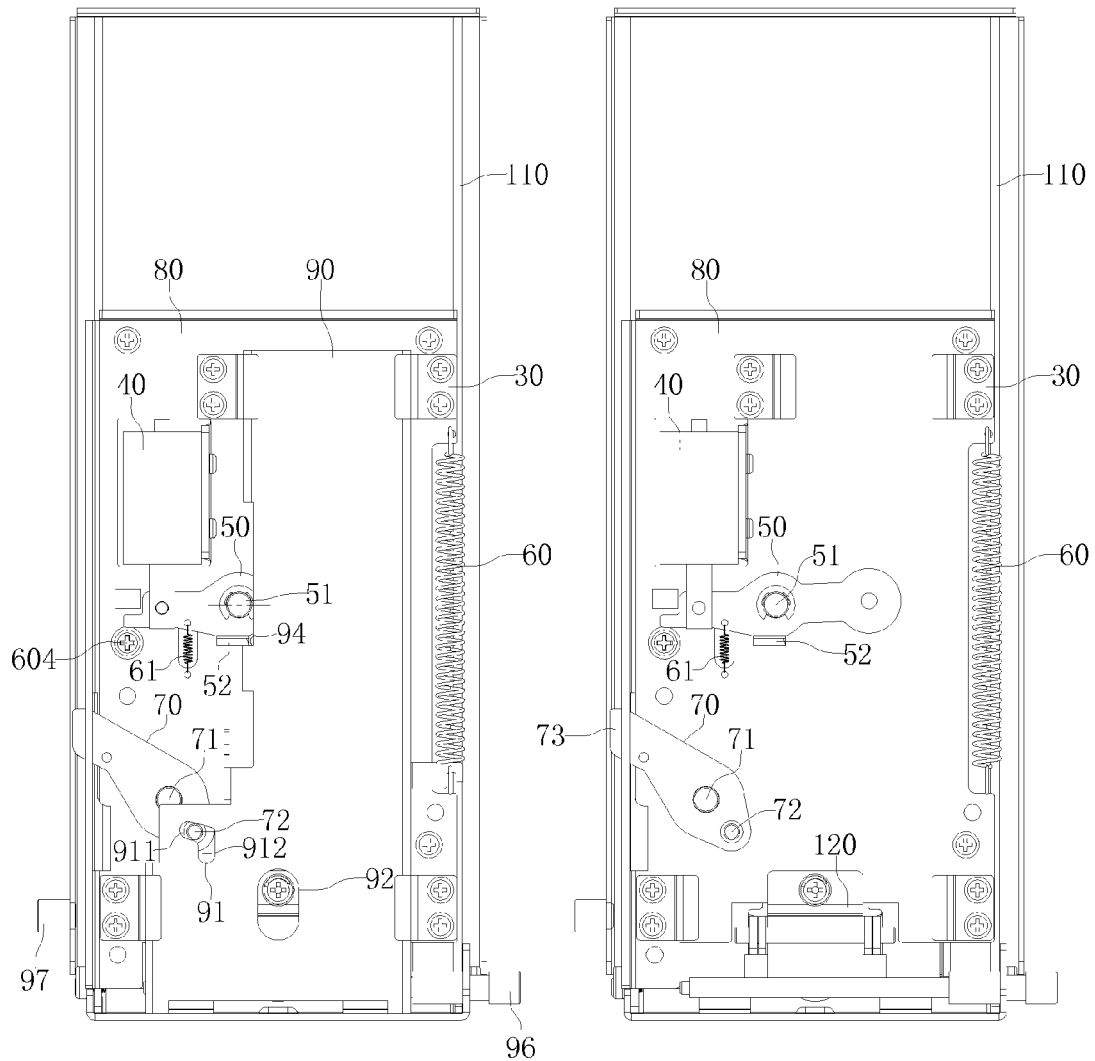
FIG. 9 is a front view of the card dispensing box shown in FIG. 8 with a circuit board 20 being removed.
FIG. 10 is a front view of the card dispensing box shown in FIG. 9 with a card shutter 90 being removed.

Further, referring to FIGS. 9 and 10, the card outlet 141 is positioned on the bottom of the box body. When the card outlet 141 is closed by the card shutter 90, the end surface of the locking end 52 of the self-locking linkage contacts with the end surface of the locking end 94, and the contacting surface is positioned at the right side of the axis of the shaft 51. Thus, with the pull of a tension spring 60, pressure moment of the end surface of the locking end 94 against the end surface of the locking end 52 makes the self-locking linkage 50 has the tendency to turn around counterclockwise. A screw 604 is arranged at the corresponding position on the left end of the self-locking linkage 50, just for stopping the self-locking linkage 50 turning around counterclockwise. This balance is kept. Before the electromagnet 40 does not act, the mechanism forms a locking state, as a result, the card shutter 90 is unable to be moved up, and the card outlet 141 is obstructed by the card shutter 90, and then the cards accommodated in the card dispending box can not be taken out.

Figure 11:
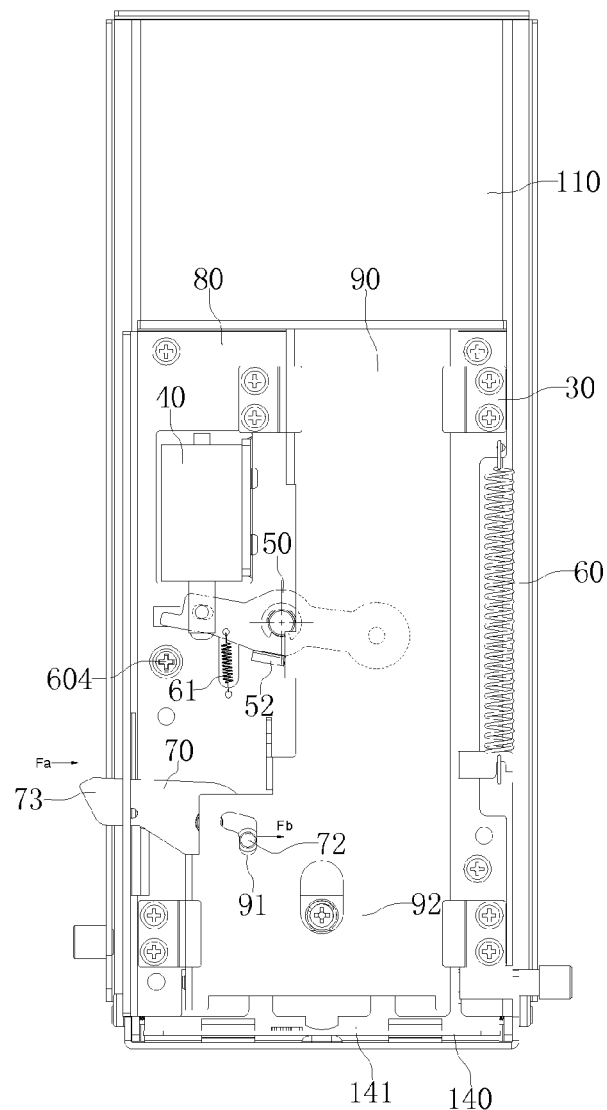
FIG. 11 is a front view of the card dispensing box shown in FIG. 9 with a card gate 90 being opened.
Figure 13:
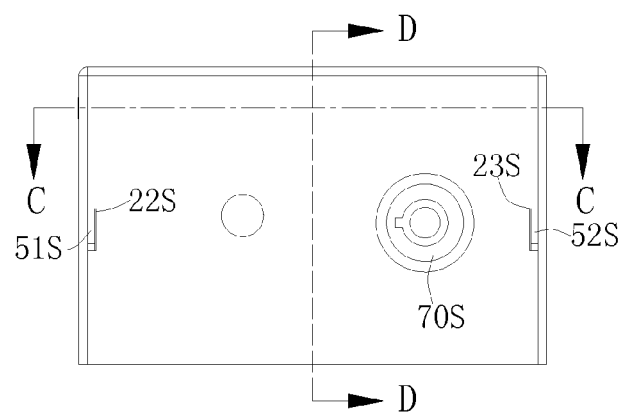
FIG. 13 is a front view of the card receiving box 1002 in FIG. 12.
Figure 12:
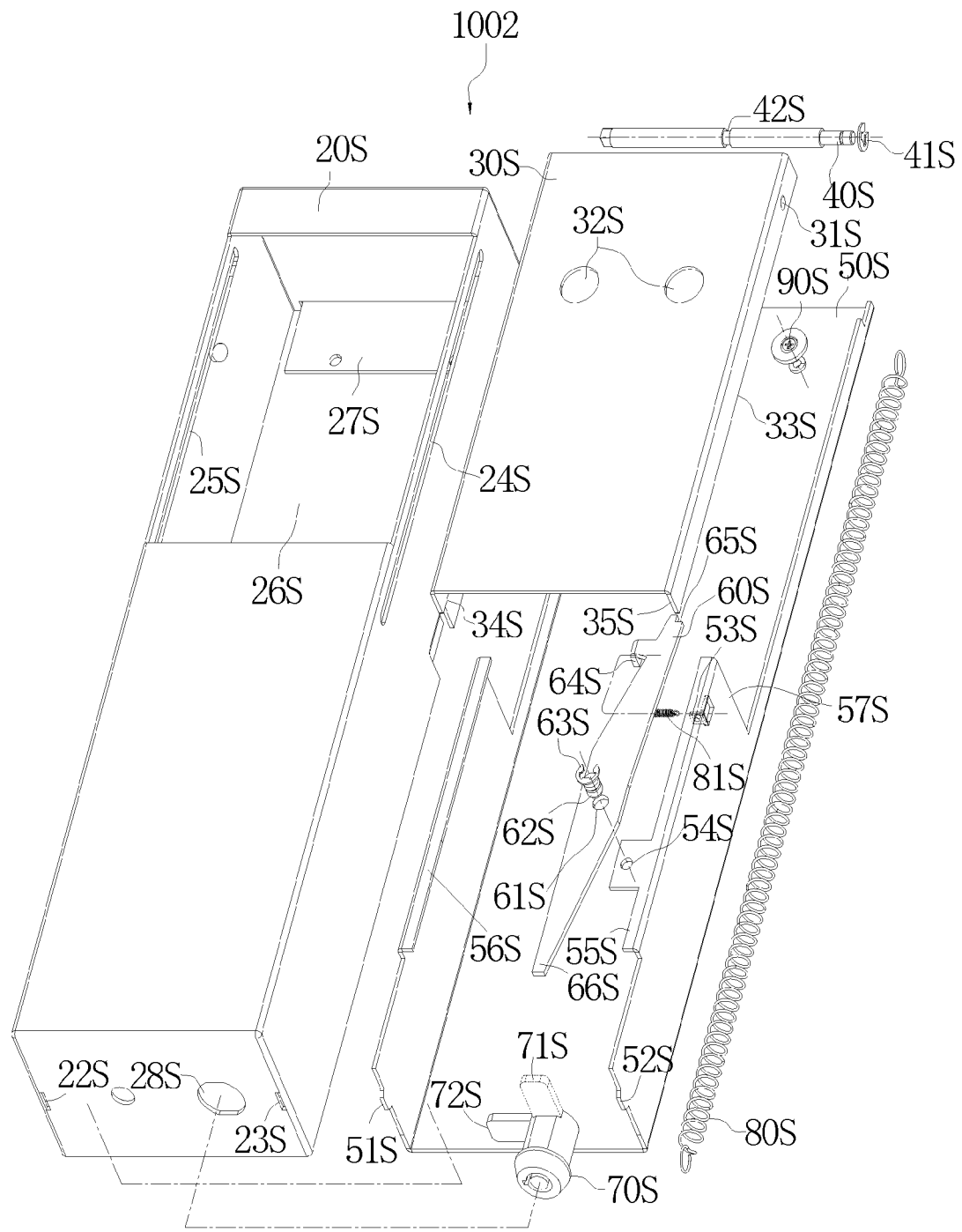
FIG. 12 is an exploded view of a card receiving box 1002 of the apparatus for receiving and dispensing cards automatically according to the present invention.

After the card dispensing box is installed in place, based on the identification and confirmation of the card receiving and dispensing main body, the card dispensing box begin to communicate with the card receiving and dispensing main body, a single chip on the circuit board 20 of the card dispensing box respond to the signal sent by the card receiving and dispensing main body, if conditions are met, power is supplied to the electromagnet 40. After the electromagnet 40 is power on, the pull rod 42 begins to act and drive the self-locking linkage 50 rotating clockwise via the pin 41. Referring to FIG. 11, when the self-locking linkage 50 turns to a certain angle, the end surface of the locking end 52 is disengaged from the end surface of the locking end 94 of the card shutter 90. With the pull of the tension spring 60, the gate card shutter 90 move up for a distance of 3-5 mm and then stops. The card outlet 141 is opened, so as to enabling dispensing cards normally. The cards 140 are dispensed out from the card dispending box by means of a hook or a rubbing card wheel arranged on the card receiving and dispensing main body.

In the present embodiment, the card shutter locking device comprises the pull rod 42, the reset spring 61, the self-locking linkage 50, the tension spring 60, the locking end 94 of the card shutter, the locking end 52 of the self-locking linkage, and the screw 604 etc. The card shutter e is locked on by a cooperation of the components as mentioned above, and the card shutter is unlocked by the electromagnet 40. It should be noted that the card shutter locking device and the electromagnet may be implemented by other structural manners, such as a structure disclosed in CN patent NO. 200820235479.7 or a manner where the card shutter is driven directly by gear and rack.

In order to improve reliability of the present invention, there is also a locking box mechanism positioned in the interlayer. The locking box mechanism comprises a card box lock lever 70, a shaft 71, a coupling shaft 72 and a profile hole 91 positioned on the card shutter 90. In FIG. 9, the card shutter 90 closes the card outlet 141, and the card box lock lever 70 is withdrawn into the card dispending box. Referring to FIG. 11, the card shutter 90 moves up, and the card box lock lever 70 is driven by the profile hole 91 to turn around counterclockwise and stretch out from the card dispending box. At the same time, a corresponding hole is arranged at the corresponding position of the card receiving and dispensing main body (such as on the side wall of the card receiving and dispensing main body) for the card box lock lever 70 entering. Before the card shutter 90 is not closed, as the card box lock lever 70 is stuck in the card receiving and dispensing main body, the card dispensing box can not be removed. Combined FIG. 9 and FIG.11, specifically, the shaft 71 is fixed on the panel 80, and one end of the coupling shaft 72 is fixed on the card box lock lever 70, and the other end passes through the profile hole 91. The profile hole 91 is roughly V-shaped, which comprises a long hole 912 with a length direction being the moving direction of the card shutter 90, and a long hole 911 at an obtuse angle to the long hole 912, wherein the long hole 911 and the long hole 912 constitutes the profile hole 91. In the state where the card shutter 90 closes the card outlet 141, the coupling shaft 72 is just positioned in the long hole 911. When the self-locking linkage 50 is driven to be unlocked by the electromagnet 40, the card shutter 90 moves upwardly, and the inner side of the long hole 911 applies a pressure on the coupling shaft 72, so as to drive the card box lock lever 70 turn around counterclockwise, as a result, a locking plate 73 of the card box lock lever 70 stretches out of the box body, as shown in FIG. 11, and the coupling shaft 72 is positioned in the long hole 912. In this situation, even if an external force Fa is applied to push the locking plate 73 inward to unlock the card dispensing box, the external force Fa may produce a force moment driving the locking plate 73 to turn around clockwise, causing the coupling shaft 72 to press toward the side wall of the long hole 912 which is parallel to the movement direction of the card shutter 90, and the resulting pressure is presented by Fb; as the pressure Fb is vertical to the contacting surface (ie. the side wall of the long hole 912), the pressure Fb is inevitably vertical to the movement direction of the card shutter 90, and the card shutter 90 still remain stationary, and the whole locking box mechanism remains in static equilibrium state. In a nutshell, in the case in which the card shutter 90 is not closed, the locking plate 73 is unable to withdraw into the box body, thereby locking the box, so as to prevent the card dispensing box from being taken out of the card receiving and dispensing main body.

During the operation of the card dispensing box, it is often needed to take it away and supplement cards into it. In this scenario, it is needed to press down the card shutter to close the card outlet 141. With regards to this, the apparatus for receiving and dispensing cards automatically is provided with a card shutter closing mechanism for driving the card shutter locking mechanism to close the card shutter.

The card shutter closing mechanism comprises a rail based gate closing mechanism which comprises a guide shaft 97 arranged on one side of the card dispensing box body, a compression shaft 95 arranged on the other side of the card shutter and extending out off the dispensing box body, and a pair of rails arranged on the card receiving and dispensing main body. The rails comprises a left rail 1214 arranged on a left panel 1204 of the card receiving and dispensing main body and a right rail 1213 arranged on a right panel 1203 of the card receiving and dispensing main body, and the two rails are arranged separately but opposite to each other; the guide shaft 97 is inserted into the left rail 1214; the compression shaft 95 is inserted into the right rail 1213. The right rail 1213 is provided with a protrusion for stopping the compression shaft 95 from moving downward; and the left rail 1214 comprises at least one stopping section corresponding to the protrusion.

Figure 5:
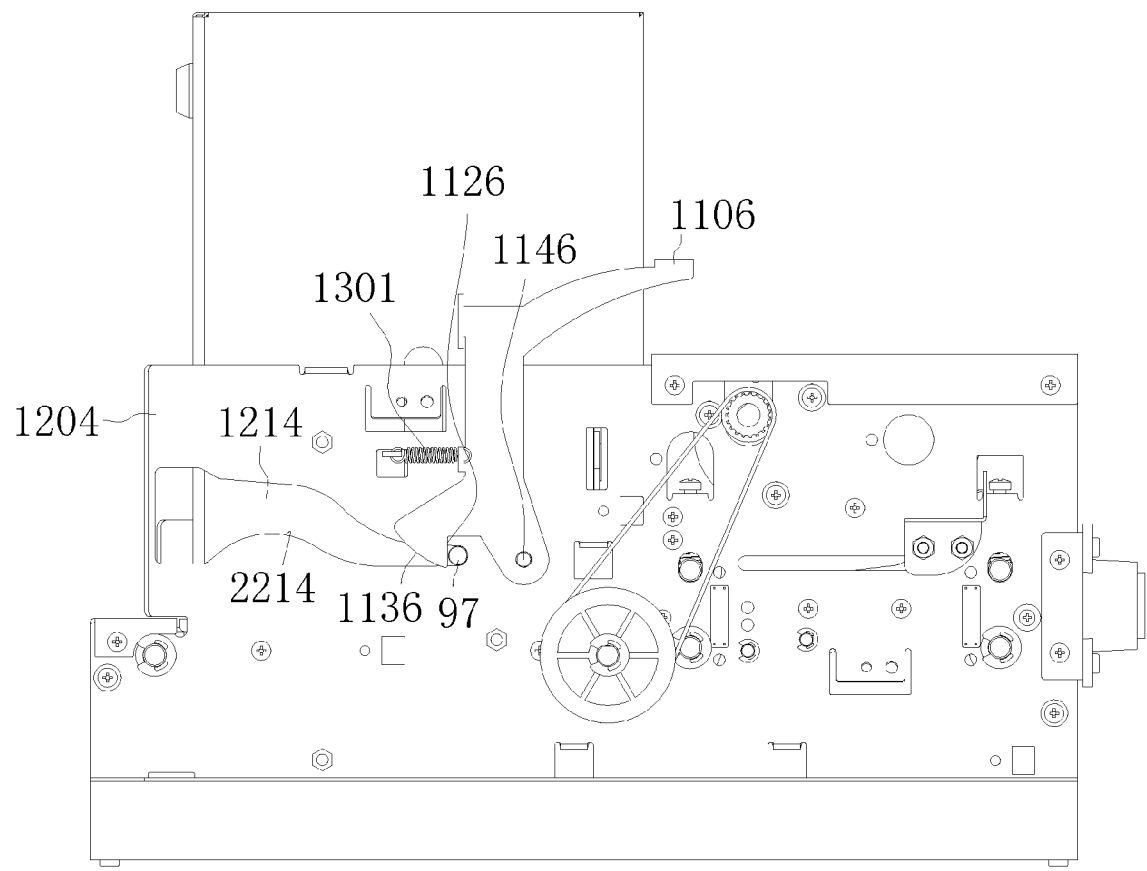
FIG. 5 is a left view of the apparatus for receiving and dispensing cards automatically according to the present invention.
Figure 17:
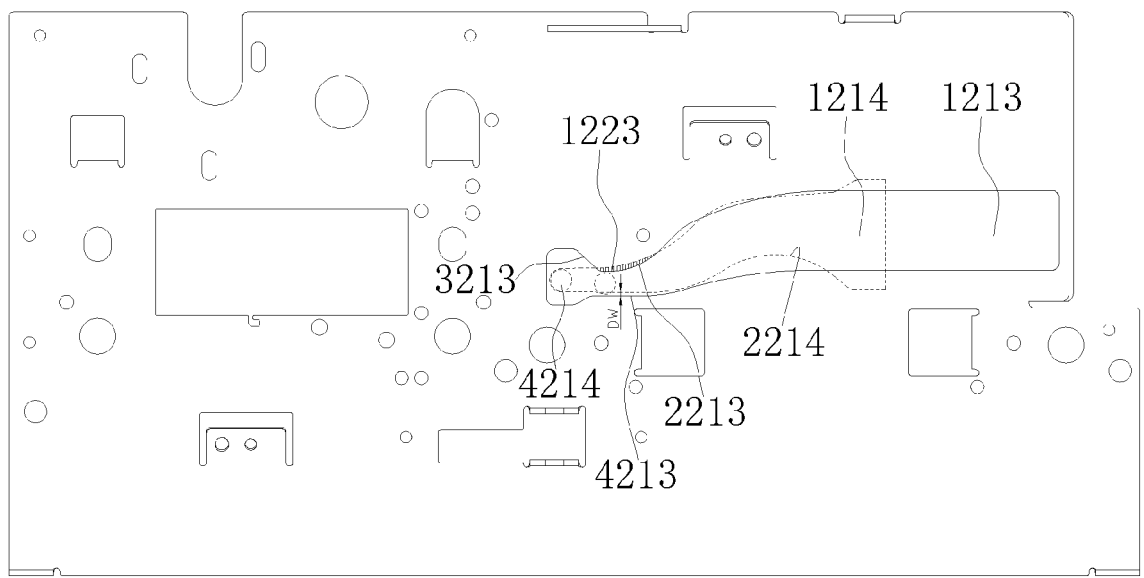
FIG. 17 is a schematic view of a rail locking mechanism of the apparatus for receiving and dispensing cards automatically according to the present invention.

The working principle of the rail-based card closing mechanism is to utilize the structure shape of the left rail 1214 on the left panel 1204 and the right rail 1213 on the right panel 1203 to enable closing the gate during the card dispensing box is drawn out. Referring to FIG. 17, the guide shaft 97 is positioned in the left rail 1214, and a protection tube 96 covering the outer of the compression shaft 95 is positioned in the right rail 1213. During the card dispensing box 1001 is removed from the card receiving and dispensing main body 1000, as the guide shaft 97 is fixed on the left side of the card dispensing box 1001, the card dispensing box 1001 has a fixed track along the removing direction, and the track is nearly same to the profile of a bottom sideline 2214 of the left rail 1214. As shown in FIG. 17, the left rail 1214 on the left panel 1204 is moved on the right panel 1203 in a translational mode, and the location where the guide shaft 97 is positioned in FIG. 5 is moved in a translational mode to that where the protection tube 96 is positioned in FIG. 2, therefore, the right rail 1213 and the left end of the left rail 1214 have a coincident point 4214 in FIG. 17. There is a region with a width of DW between the bottom sideline 2214 of the left rail 1214 and the bottom sideline of the right rail 1213. During the card dispensing box 1001 is removed from the apparatus for receiving and dispensing cards, as the card dispensing box is supported by the bottom sideline 2214 of the left rail 1214, the protection tube 96 positioned in the right rail 1213 may be acted upon by the pressure applied by the inclined plane 3213 (forming a protrusion) firstly, so as to close the card shutter 90. In the overlap region 1223 of the right rail 1213 and the left rail 1214, the protection tube 96 is pressed by the sideline 2213 to move downward fatherly. After the card shutter 90 is closed, the protection tube 96 may still move downward for about 1.5 mm to ensure the card shutter 90 is closed reliably. If the card shutter 90 is not closed because of the stopping of the card 140, the protection tube 96 is unable to pass through the overlap region 1223, and the card dispensing box 1001 can not be removed. That is, when the card shutter is not closed, the card dispensing box in the apparatus for receiving and dispensing cards automatically can not be removed.

Further, the card shutter closing mechanism also comprises a compression-bar-based gate closing mechanism for assisting in closing the card shutter. The compression-bar-based gate closing mechanism comprises a compression bar 1106 rotatably mounted on the card receiving and dispensing main body, and a compression-bar reset spring 1301 for driving the compression bar 1106 to reset. The compression bar 1106 comprises a left arm and a right arm respectively mounted on the left panel 1204 and the right panel 1203 by shafts, and a handle across the left panel 1204 and right panel 1203 for linking the left arm with the right arm. The compression-bar reset spring 1301 is mounted between the left panel 1204 and the left arm. The left arm is provided with an arc surface 1136 intervening with the left rail 1214 in the lower part, and a card stopping surface 1126 is arranged at the inner side of the arc surface 1136. The guide shaft 97 contacts and drives the arc surface 1136 to drive the compression bar 1106 turning around clockwise. After the guide shaft 97 passes through the arc surface 1136, the compression-bar reset spring 1301 drives the compression bar 1106 turning around counterclockwise, and the guide shaft 97 is stuck against the card stopping surface 1126 to form a locking state. The right arm is provided with a shaft pressing surface in the lower part for suppressing the compression shaft in the unlocking operation. The right panel 1203 is provided with a stopping plate 1224 for stopping the compression bar 1106 from turning around counterclockwise in the locking state.

Figure 2:
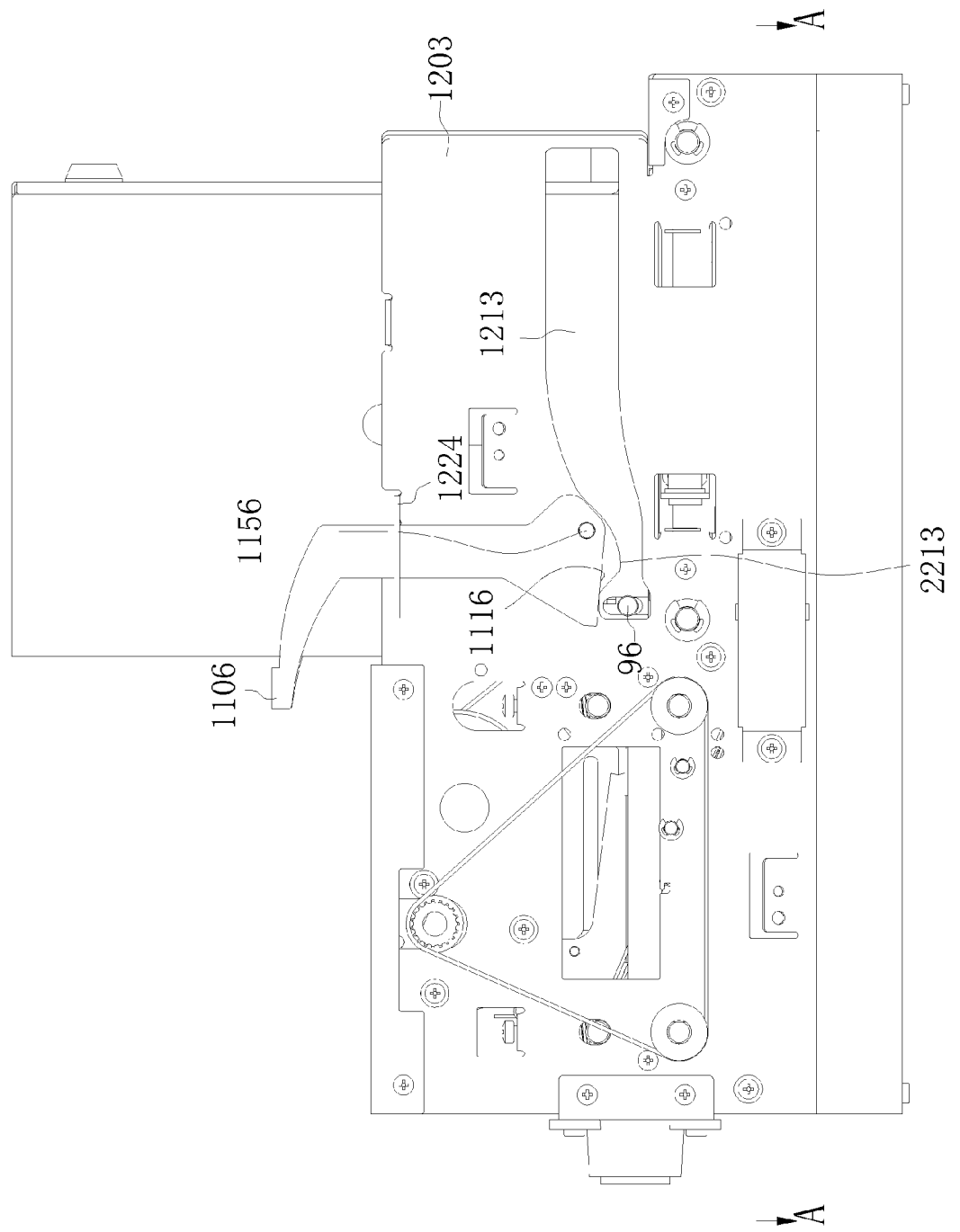
FIG. 2 is a right view of an apparatus for receiving and dispensing cards automatically according to the present invention.
Figure 3:
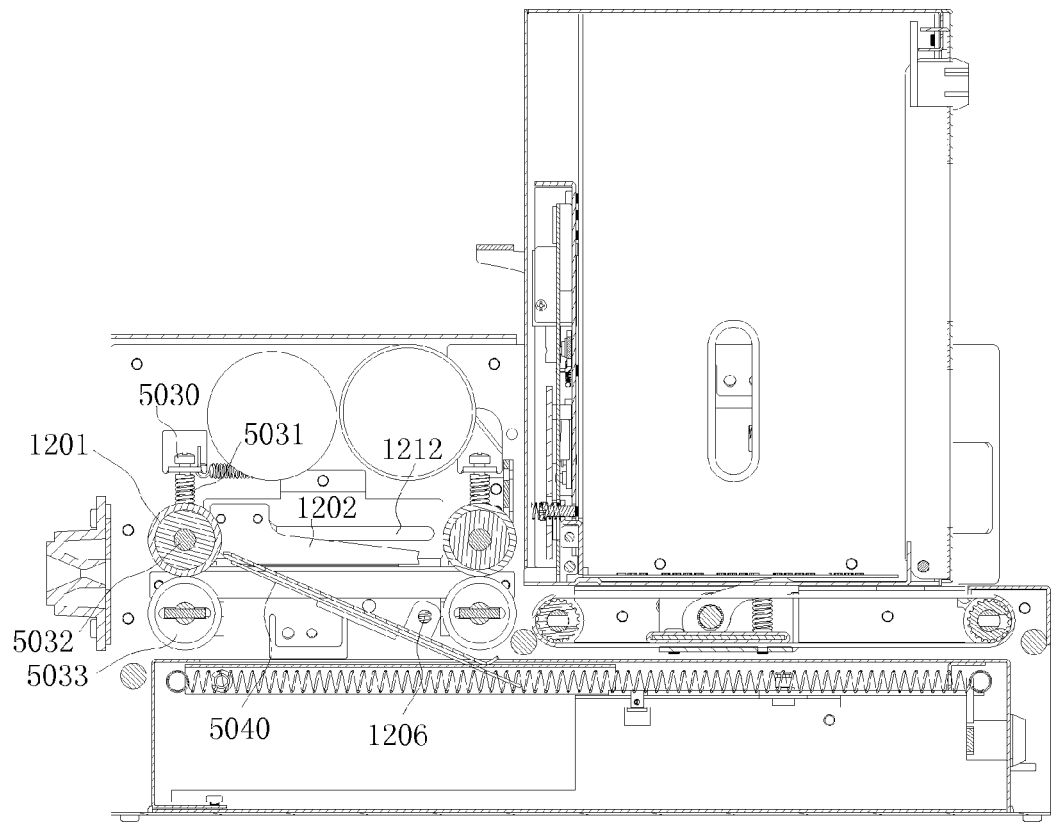
FIG. 3 is a cutaway view taken along a section line A-A in FIG. 2.
Figure 4:
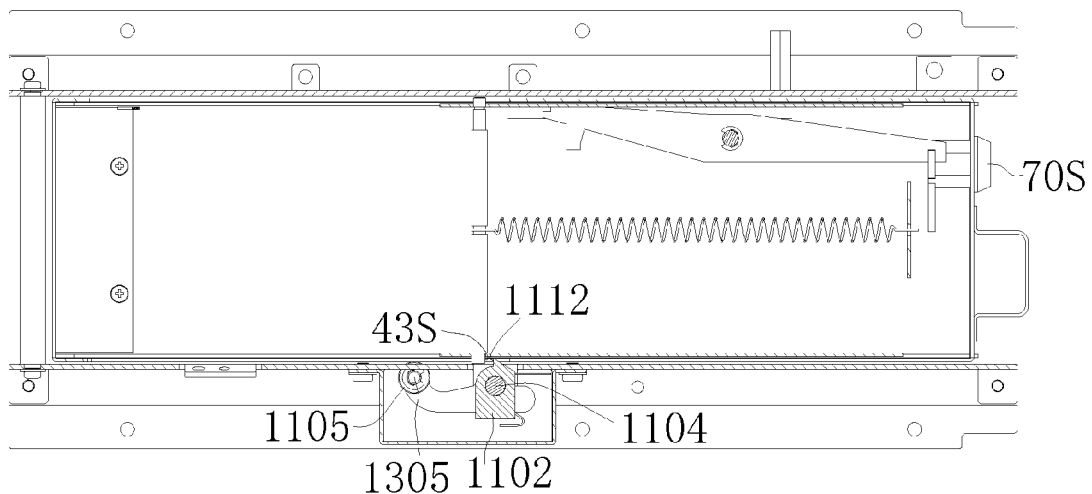
FIG. 4 is a section view of a card receiving box of the apparatus for receiving and dispensing cards automatically according to the present invention.

As shown in FIG. 5, a cavity is formed between the left panel 1204 and right panel 1203 of the apparatus for accommodating the card dispensing box. When the card dispensing box is pushed into the card receiving and dispensing main body, the guide shaft 97 at the right side of the card dispensing box 1001 enters the left rail 1214. When the card dispensing box 1001 is pushed to contact with the arc surface 1136 of the compression bar 1106, the guide shaft 97 applies pressure on the arc surface 1136 of the compression bar 1106, and then the compression bar 1106 turns clockwise around a shaft 1146 supported on the left panel 120. When the card dispensing box 1001 reaches a limiting position, with the pull of the spring 1301, the compression bar 1106 rotates counterclockwise until the guide shaft 97 contacts with the card stopping surface 1126 of the compression bar 1106. At the moment, the mechanism is locked, when the card dispensing box 1001 is removed, if the compression bar 1106 is not pressed down, the compression bar 1106 may turn around counterclockwise, and the stopping plate 1224 as shown in FIG. 2 may stop the compression bar 1106 from turning around counterclockwise, and then the card dispensing box 1001 is locked. To unlock the card dispensing box, it is just needed to press down the compression bar 1106, and the shaft pressing surface 1116 of the compression bar 1106 presses down the protection tube 96, so as to close the card shutter 90, also the gate closing action of the card dispensing box 1001 is enabled, and the card dispensing box 1001 may be removed from the apparatus for receiving and dispensing cards 1000.

Further, the right end of the compression shaft 95 may be covered with the protection tube 96. The protection tube 96 is exposed outside the box body and is linked with the card shutter 90. When closing the gate, it is just needed to press down the protection tube 96. In the actual operation, the card dispensing box may be subjected to various unpredictable impact damages. To ensure that the card shutter 90 is able to slide freely along the side rail reliably, it is needed to absorb any possible load applied to the protection tube. Thus, the protection tube 96 is set with a structure that two ends are bigger than the middle. The interfaces between the bigger part and the smaller part are an inner interface 961 and an outer interface 962 successively from left to right. The protection tube 96 is utilized to absorb external impact to protect the card shutter 90 from being damaged. The inner interface 961 contacts with an inner surface 151 at the right side of the box base 150, and the outer interface 962 contacts with an outer surface 12 at the right side of the box cover. A long groove 152 positioned on the box base 150 and a long groove 13 positioned on the box cover are parallel to each other and form the rails, so as to enable the smaller part at the middle of protection tube 96 being positioned in the rails and moving up and down freely.

Figure 16:
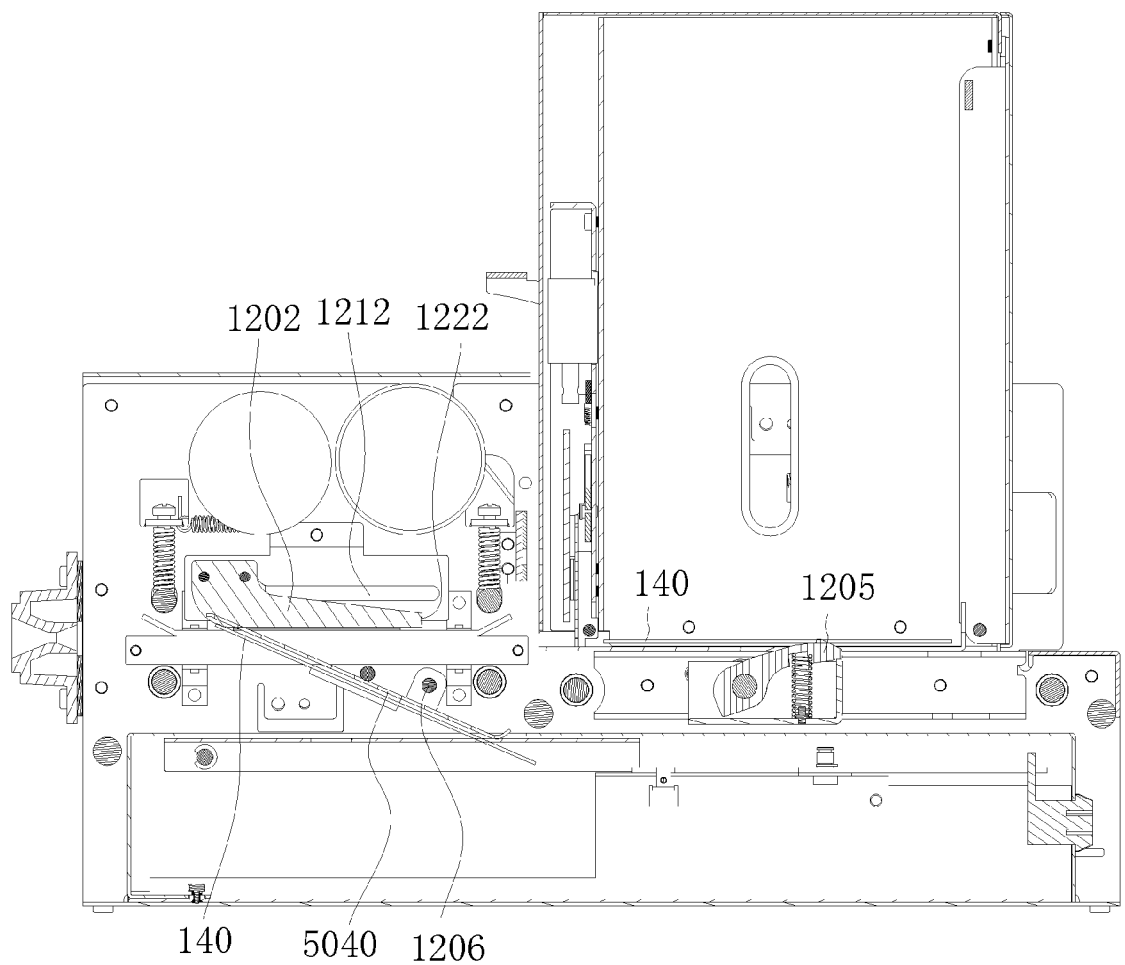
FIG. 16 is a section view of the apparatus for receiving and dispensing cards automatically along a direction of a plane of a pull-back hook 1202 according to the present invention.
Figure 19:
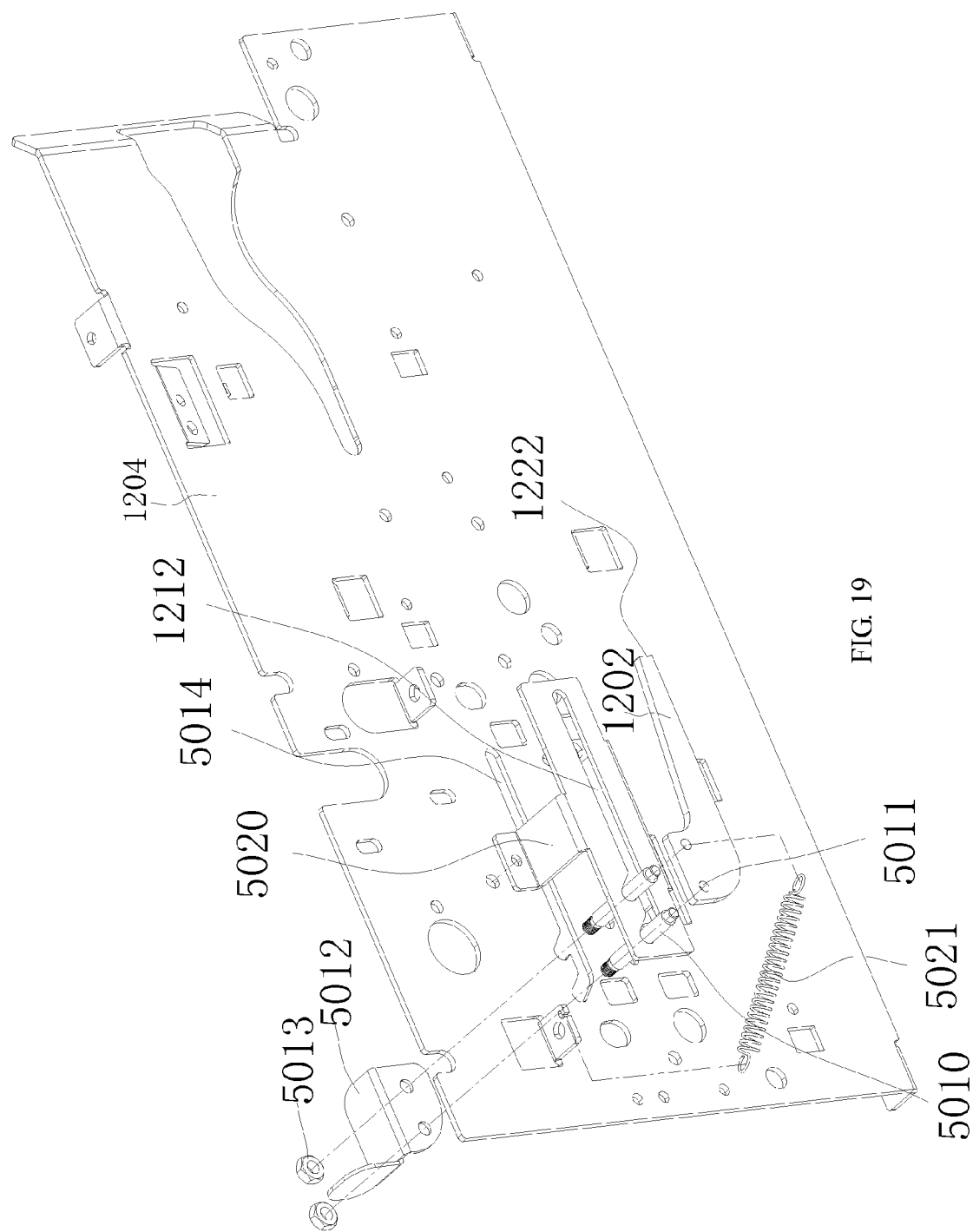
FIG. 19 is a view of a card receiving mechanism of the apparatus for receiving and dispensing cards automatically according to the present invention.
Figure 20:
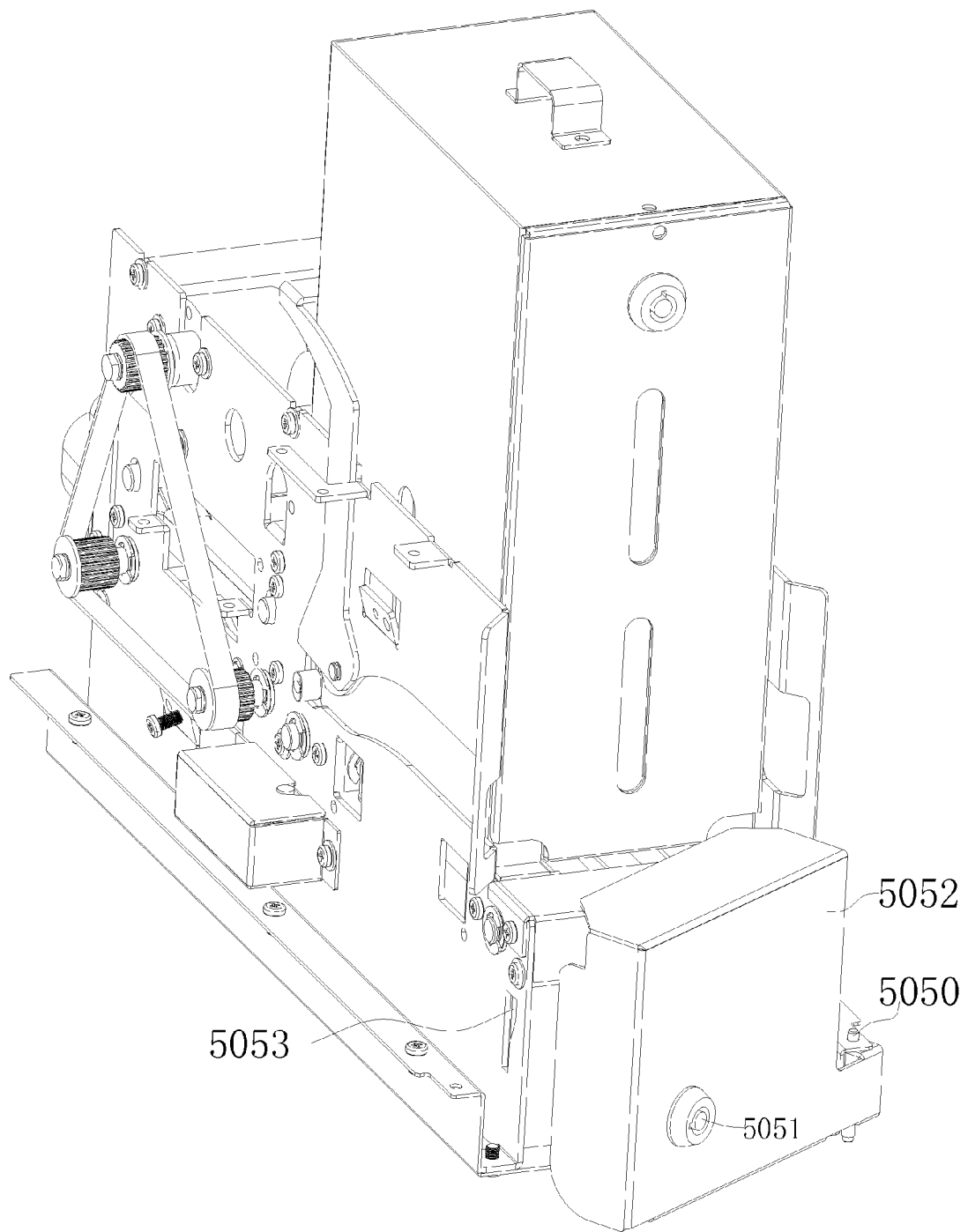
FIG. 20 is a schematic diagram of the apparatus for receiving and dispensing cards automatically with a card box theft-proof mechanism according to the present invention.

In the scenario where the card 140 is stuck in the card outlet 141, the card dispensing box can not be removed, as a result, the apparatus for receiving and dispensing cards automatically is provided with a card receiving mechanism. As shown in FIGS. 16 and 19, the card receiving mechanism is arranged on the card receiving and dispensing main body and comprises a bracket 5020 arranged on one side panel (such as the left panel 1024), rails 1212 and 5014 mounted on both the bracket and the panel, a supporting shaft 5010 sliding-mounted on the rails 1212 and 5014, a pull-back hook 1202 fixed-mounted on the supporting shaft 5010, a wretch 5012 mounted on one end of the supporting shaft 5010 which stretches out of the panel, and a reset spring 5021 with two ends being fixed on the panel and the supporting shaft 5010 respectively. The supporting shaft 5010 may be a structure with dual supporting shafts or with a single supporting shaft.

The profiles of the rails 1212 and 5014 are nearly the same. At least one section of the rails 1212 and 5014 are inclined upward from the card outlet of the card dispensing box in a direction away to the card outlet. In the present embodiment, the rails 1212 and 5014 are approximately "L"-shaped, and an obvious abdicating groove is arranged on their highest point. At an initial position, the reset spring 5012 pulls the supporting shaft 5010 to be on the highest point of the rails 1212, 5014, at the moment, the location of the pull-back hook 1202 is higher than that of the card outlet, and the card may pass normally through the space below the pull-back hook 1202. When the wretch 5012 is pulled, the pull-back hook 1202 moves downward firstly, and then moves horizontally, so as to push the card 140 back into the card dispensing box. After releasing the wretch 5012, the pull-back hook 1202 is driven by the spring 5021 to go back to the initial position rapidly.

The card dispensing box is provided with a hook 1205 on the bottom for transferring the card 140 in the card dispensing box 1001 to the card dispensing mechanism to be dispensed. The card dispensing box is provided with a long hole for letting the hook 1205 pass through, but the card is unable to pass through the long hole in any way. That is, the largest size of the long hole is smaller than the smallest width of the card 140. Further, the apparatus for receiving and dispensing cards automatically comprises a card-dispensing vibration damping mechanism to reduce vibration produced during dispensing the cards. The card-dispensing vibration damping mechanism comprises a driving wheel 5033 driven by a motor to turn around and fixed on the card receiving and dispensing main body, a card transporting wheel 1201 opposite to the driving wheel 5033, and a spring 5031 for suppressing the card transporting wheel 1201. The card transporting wheel 1201 is rotatable-mounted on the card receiving and dispensing main body by the supporting shaft 5032. The supporting shaft 5032 is provided with a screw 5030 with the other end passing through a bending hole arranged on one side panel of the apparatus for receiving and dispensing cards automatically. The screw 5030 is covered by the spring 5031, two ends of the spring 5031 connect to the supporting shaft 5032 and the bending hole of the card receiving and dispensing main body respectively, such that vibration produced by the card transporting wheel 1201 and the driving wheel 5033 is absorbed by the spring 5031. When the driving wheel is driven by a motor, the card 140 is transported by means of friction force produced between the card transporting wheel 1201, the driving wheel 5033 and the card. When the card 140 passes between the card transporting wheel 1201 and the driving wheel 5033, as the driving wheel 5033 is fixed on the card receiving and dispensing main body, the card transporting wheel 1201 may be extruded by the card 140 to be tilted up, and vibration of the card transporting wheel 1201 may be absorbed by the spring 5031. At the moment, a reaction force produced by the spring 5031 drives the card transporting wheel to remain the tendency of moving toward the driving wheel, so as to press the card tightly and also ensure the card sending force for transporting the cards during the cards is transported.

Further, a card distributing plate 120 is arranged at the card outlet and passes through the two bending holes 115 on the shaft 121 and the box wall 110. The card distributing plate is provided with a threaded hole 122, and a screw 602 passes through the threaded hole 122 for adjusting the verticality of the card distributing plate 120 relative to the box wall 110. The screw 602 may be adjusted directly through a screwdriver passing through an adjusting hole 92. With the pressure from a pressure spring 62, one end of the screw 602 leans against the box wall 110, such that the card distributing plate is able to turn around only in a single direction, and the pressure spring covers the screw 602 in order to ensure a reset of the card distributing plate during turning around only in a single direction. In the process where the apparatus for receiving and dispensing cards automatically is dispensing cards, when the card 140 is stuck at the card outlet 141 for some possible reasons, a slice and a finger may be utilized to push the card back into the card dispending box, so as to ensure the card shutter 90 of the card dispending box may be closed. The card distributing plate 120 is set to enable turning in a direction where the card is pushed back, so as to ensure the card can be pushed back into the card dispending box easily. The card outlet 141 is comprised of the card distributing plate 120 and the box base 150. The card outlet 141 has a gap allowing only a card to pass through. The card distributing plate 120 is supported in the interior of the box body by the shaft 121 and may rotate around the shaft 121.

In order to retrieve and store the cards withdrawn by the card receiving and dispensing main body, the card receiving and dispensing main body is further provided with a card receiving box. Referring to FIGS. 12-15, the card receiving box is inserted and mounted within the card receiving and dispensing main body, and comprises a card receiving box body, a card inlet arranged on the card receiving box body, and a card receiving gate mechanism for opening and closing the card inlet.

The card receiving box body comprises a box base 50s and a box cover 20s; wherein, the box base 50s is positioned in a cavity of the box cover 20S, and the box cover 20s is provided with the card inlet on the top. The card receiving gate mechanism is accommodated between the box base 50S and the box cover 20S, and comprises a card shutter 30S, a self-locking linkage 60S, a pin 62S, a E-shaped ring 63S, a tension spring 80s and a tension spring 81s etc. The pin 62s passes through a circular hole 54s on a bending part 55s and a circular hole 61s on the self-locking linkage 60S, and the E-shaped ring 63s is clipped at the end of the pin 62S, such that the self-locking linkage 60s may turnaround the pin 62s reliably without sliding away from it. The self-locking linkage 60s is provided with a bending part 64s at its end, correspondingly, the box base 50S is provided with a bending part 64s on the sidewall 57s. The tension spring 81s has one end hooked on the bending part 64s and the other end hooked on bending part 53s. The pull by the tension spring 81s makes the self-locking linkage 60s has a tendency of moving toward the sidewall 57s of the box base 50S.

The card shutter 30s is a U-shaped structure, and comprises two bending parts 33S, 34s; wherein, the bending part 33s sliding-contacts the surface of the bending part 55S, and the bending part 34s sliding-contacts the surface of the bending part 56S. After the box cover 20s covers the box base 50S, a rail cavity is formed by the inner surface of the box cover 20S, the surface of the bending part 55S, and the surface of the bending part 56s. The card shutter is accommodated in the cavity and slides along the rail; wherein, the sliding direction is parallel to the direction of the tension spring 80s. One end of the tension spring 80s is hung on a circular groove 42s of a gate spindle 40S, and the other end connects to the box body 10s. The gate spindle 40s passes through a via 31s. The end of the self-locking linkage 60s is stuck by the E-shaped ring 63s to ensure the stability of the self-locking linkage 60s. The long holes 24S, 25s are positioned on the two sidewalls of the box cover 20 respectively, and the two ends of the gate spindle 40s just passes the corresponding long holes 24S, 25s.

The box base 50S is provided with locating holes 22S, 23S on one end, and the box cover 20S is provided with locating protruding-platforms 51S, 52S on the corresponding end; the locating protruding-platforms is just positioned in the locating holes. On the other end, the box base 50S is connected with the box cover 20S by threaded connection. In the assembling, firstly, the box base 50S is covered by the box cover 20S; then, the locating protruding-platforms 51S, 53S is aligned to the locating holes 22S, 23S and then inserted therein; after that, the screw 90S is utilized to screw the box body 10S from inside to outside by the card entering the open 26S of the box body; wherein, the structure relation from inside to outside is followed with a screw cap of the screw 90S, the bending part 27S on the bottom of the box cover 20S, the screw and the box base 50S are screwed together.

After the card shutter mechanism as shown in FIG. 15 is pulled away from the open 26s by the tension spring 80S, the width of the open 26s is larger than that of the card 92s. After the box body 10s is opened, the card 92s may be retrieved into the card receiving box reliably. The figure shows the scenario where the card 92s enters the cavity 11s via the open 26S, and the card 92s stacks in the cavity 11s. This generally represents the card retrieving process of the apparatus for receiving and dispensing cards automatically of the present invention. When the card shutter is closed, the card loading process may be observed through a window 32s on the card shutter.

A hollow rail is just formed by the bending part 55S on the box base 50S and the top inner surface 29S of the box cover 20S as shown in FIG. 15, and the card-receiving gate mechanism is just positioned in the rail and moves along the rail.

Referring to FIG. 14, in the process where the card receiving box is removed from the apparatus for receiving and dispensing cards, the card shutter 30s moves along the opposite direction of the pull of the tension spring 80s under the external force by the apparatus. When the card shutter 30s is away from contacting with the self-locking linkage 60S, the self-locking linkage 60s turn counterclockwise around the pin 62s under the pull of the tension spring 80S, and ultimately contacts with the inner surface 21 S of the box cover 20s. Under action of the tension spring 80S, the locking surface 35s of the card shutter 30s presses toward the surface of the locking end 65s of the self-locking linkage 60S, and then self locking is formed. At the moment, the open 26s on the box cover 20s is completely blocked by the card shutter 30S, and the whole card receiving box is sealed, such that the cards in the cavity 115 can not be taken out any longer. If the card shutter 30 is pushed tentatively, according to Newton's third law, the push force is transferred from the lower surface 35s of the card shutter to the upper surface 65s of the self-locking linkage 60s. To the structure, as the push vector is on the right of the pin 62S, the self-locking linkage 60s turns around counterclockwise under the push moment, so as to make the self-locking linkage 60s contact the inner surface 21s of the box cover 20s more tightly to form self locking. The greater the push force is, the stronger the self-locking ability is, and such that the card receiving box can not be opened by striking the card shutter 30s. This is the working principle of the self-locking mechanism in the invention.

If someone wants to open the card shutter 30S, it is needed that a key turns a cam lock 70S mounted on the box cover 20S through a lock hole 28S. The lock tongue of the cam lock 70S turns from the location of 71S to the location of 72S, and then contacts with the surface of the unlocking end 66S of the self-locking linkage 60S. The self-locking linkage 60S turn counterclockwise around the pin 62S, and then the surface 35S of the card shutter 30S is away from contacting with the surface 65S of the self-locking linkage 60S. The card shutter 30S slides under the force of the tension spring 80S, and then the card shutter 30S is opened, as a result, the card 92S within the card receiving box can be taken out.

The apparatus for receiving and dispensing cards automatically further comprises a card-receiving shutter closing mechanism for driving the card-receiving shutter mechanism to close the card inlet. When the card receiving box 1002 is removed, after the automatic operation of the shutter closing mechanism, the shutter is automatically closed during the removal; otherwise, the card receiving box can not be removed from the apparatus for receiving and dispensing cards successfully.

Referring to FIG. 14, the card-receiving shutter closing mechanism comprises a box hook 1102 mounted on one side panel of the card receiving and dispensing main body (such as the right panel 1203), and a stopping part arranged at an inner side of the box hook 1102. The box hook 1102 turns around the shaft 1104 fixed on the right panel 1203. During the process where the card receiving box is removed from the apparatus for receiving and dispensing cards, an end 1112 of the box hook 1102 is hooked with the end 43S of the shutter spindle 40S. In the scenario, a roller 1105 that may turn around the shaft 1305 supported on the left end of the box hook 1102 is supported on the side of the box cover 20S of the card receiving box. The shaft 1305 and the roller 1105 form the stopping part pressing against the sidewall of the card receiving box. When the card receiving box is removed from the apparatus for receiving and dispensing cards, the box hook 1102 has a tendency to turn around clockwise under the pressure of the end 43S of the gate spindle 40S, but the tendency is blocked by the sidewall of the box cover 20S. The card gate 30S is hooked up by the box hook and move gradually to the location where the card shutter of the self locking mechanism of the card receiving box locks, such that the card shutter 30S has been closed reliably. After moving for an idle stroke of about 5~10 mm, the roller 1105 is away from contacting with the sidewall of the box cover 20S. The box hook turns around clockwise under the pressure of the end 43S of the shutter spindle 40S. The end 1112 of the box hook 1102 does not contact with the end 43S of the shutter spindle 40S any longer. The card shutter of the card receiving box has been closed, and the shutter closing mechanism is unhooked automatically, such that the card receiving box can be removed successfully. If the card gate 30S is not closed, the card shutter 30S is unable to move to the card locking location of the self-locking mechanism of the card receiving box, and the roller is still supported by the side of the box cover 20S of the card receiving box. As a result, the card receiving box can not be pulled out, so as to ensure the card receiving box can be pulled out only if the card shutter 30 is closed reliably.

In order to facilitate the received card to fall into the card receiving box, the card receiving and dispensing main body is provided with a receiving plate 5040, which is rotatably mounted on the shaft 1206 and has a moment of turning clockwise under the deadweight moment or the spring moment. During the card is dispensed from left of the card dispensing box 1001, the card 140 may pass through the receiving plate 5040 successfully. When the card has passed through the transmission wheel 1201 on the most left end of the receiving plate and then reverses, the card 140 is guided by the inclined receiving plate 5040 to enter the card receiving box 1002.

In order to prevent the card dispensing box and the card receiving box are removed as a whole, the apparatus for receiving and dispensing cards automatically further comprises a card box theftproof mechanism. The card box theftproof mechanism comprises a gate spindle 5050 fixed on the card receiving and dispensing main body, a security gate 5052 mounted on the gate spindle 5052 in a rotary way, a cam lock 5051 arranged on the security gate 5052, and a lock hole arranged on the sidewall of one side panel of the card receiving and dispensing main body. The card dispensing box and the card receiving box are enclosed within the card receiving and dispensing main body by the security gate 5052. When being closed, the security gate 5052 rotates counterclockwise the cam lock 5051, and the tongue of the cam lock 5051 stretches into the lock hole 5053 on the right panel 1203, such that neither of the two card boxes can be pulled out.

Figure 23:
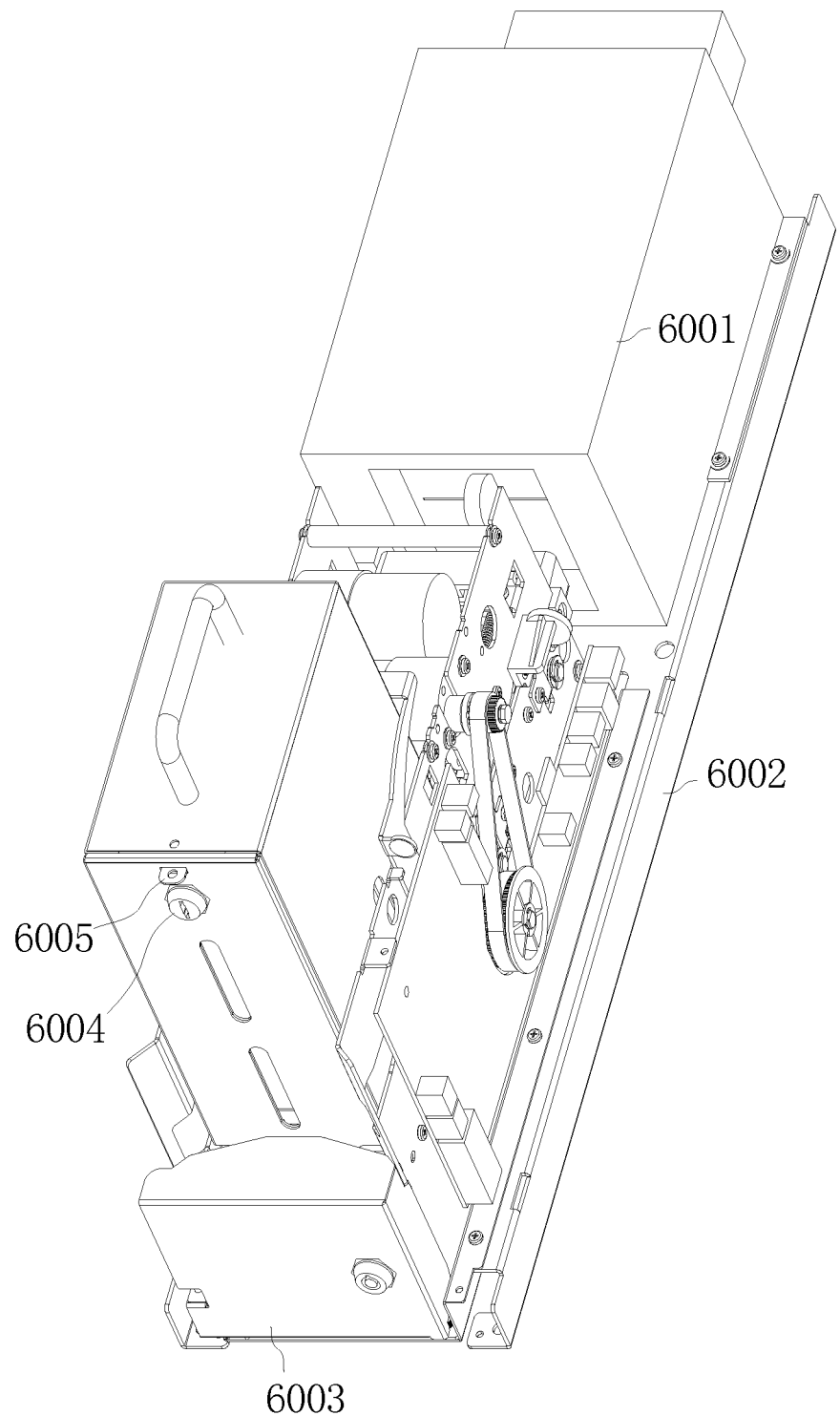
FIGS. 23 and 24 are schematic diagrams of an embodiment for application of the apparatus for receiving and dispensing cards automatically according to the present invention in combination with a card reader.
Figure 24:
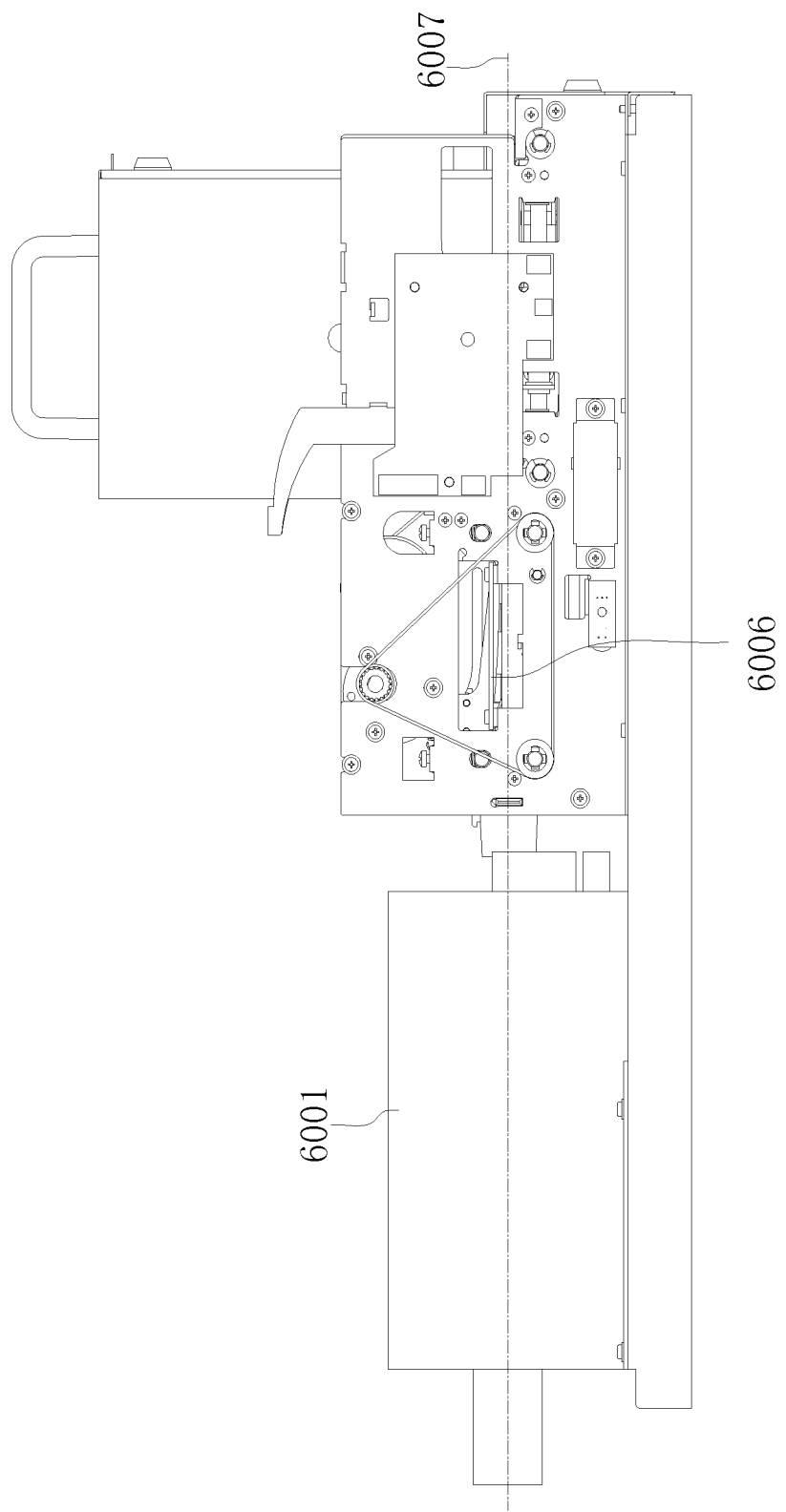

FIG. 23 shows an embodiment of an application of the apparatus for receiving and dispensing cards automatically according to the present invention in combination with a card reader, wherein a card reader 6001 and the apparatus for receiving and dispensing cards automatically are both mounted on a stand 6002, and the card reader 6001 is opposite to the card outlet of the apparatus for receiving and dispensing cards. The card dispensed from the apparatus enters into the card reader 6001 to be read and written, and then the card is dispensed by the card reader. When a situation such as misoperation, card withdraw or card swallow happens, the card exits from the card reader and enters the card receiving box of the apparatus for receiving and dispensing cards. Further, the box dispensing box is provided with a cam lock 6004 on the upper part, and a sheet metal plate 6005 with holes, so as to utilize the lock to lock more tightly. The spindle of the security gate 6003 of the box dispensing box 1001 may be arranged on the left, so as to facilitate opening of the security gate 6003. As shown in FIG. 24, a radio frequency card reader 6006 is arranged near and parallel to the card transporting track 6007 of the apparatus for receiving and dispensing cards automatically, such that the card is read and written by RF card reader 6006 when it passes through the card transporting track 6007.

What is claimed is:

1. An apparatus for receiving and dispensing cards automatically, comprising a card receiving and dispensing main body, and a card dispensing box removably installed on said main body; the card dispensing box comprising a card dispensing box body, a card outlet configured on said card dispensing box body, and a card shutter for opening and closing said card outlet; wherein said card dispensing box also comprises a card shutter locking device for controlling opening and closing of said card shutter; said apparatus also comprises an identification and unlocking device, which controls action of the card shutter locking device on the card dispensing box matched with the card receiving and dispensing main body so as to open the card shutter of the card dispensing box; wherein card shutter locking device further comprises a card shutter locking mechanism for controlling the opening and closing of said card shutter and a electric unlocking mechanism for triggering and driving the action of the card shutter locking mechanism; said identification and unlocking device comprises a conductive mechanism and a communication mechanism arranged on the card receiving and dispensing main body and the card dispensing box, a memory arranged on the card dispensing box for storing identification information, and a controller arranged on the card receiving and dispensing main body; when the card dispensing box is positioned in the card receiving and dispensing main body, the conductive mechanism is connected to supply power to the card dispensing box, and communication is established between the card receiving and dispensing main body and the card dispensing box; the controller reads and verifies the identification information of the card dispensing box by the communication mechanism, if it is verified successfully, the electric unlocking mechanism is controlled to act to trigger the card shutter locking mechanism to open the card shutter.

2. The apparatus for receiving and dispensing cards automatically of claim 1, wherein the card shutter locking device comprises a card shutter locking mechanism for controlling the opening and locking of the card shutter, and mechanical unlocking mechanism for triggering the action of the card shutter locking mechanism.

3. The apparatus for receiving and dispensing cards automatically of claim 2, wherein the identification and unlocking device comprises a key and a lock cylinder mounted on the card receiving and dispensing main body and the card dispensing box, respectively; when the card dispensing box is mounted in the card receiving and dispensing main body, the matched key is inserted into the lock cylinder, so as to drive the mechanical unlocking mechanism to trigger the card shutter locking mechanism to open the card shutter.

4. The apparatus for receiving and dispensing cards automatically of claim 1, wherein the apparatus further comprises a card shutter closing mechanism for driving the card shutter locking mechanism to close the card shutter.

5. The apparatus for receiving and dispensing cards automatically of claim 4, wherein the card shutter closing mechanism comprises a guide shaft arranged on one side of the card dispensing box body, a compression shaft arranged on the other side of the card shutter and extending out of the card dispensing box body, and a pair of rails arranged on the card receiving and dispensing main body; the rails comprises a left rail arranged on a left panel of the card receiving and dispensing main body and a right rail arranged on a right panel of the card receiving and dispensing main body, and the two rails are separately but opposite to each other; the guide shaft is inserted into the left rail, and the compression shaft is inserted into the right rail; the right rail is provided with a protrusion for stopping the compression shaft from moving downward; the left rail comprises at least one stopping section corresponding to the protrusion.

6. The apparatus for receiving and dispensing cards automatically of claim 4, wherein the card shutter closing mechanism comprises a compression bar rotatably mounted on the card receiving and dispensing main body, and a compression bar reset spring for driving the compression bar to reset; the compression bar comprises a left arm and a right arm respectively mounted on the left panel and the right panel by shafts, and a handle across the left panel and right panel for linking the left arm with the right arm; the compression-bar reset spring is mounted between the left panel and the left arm; the left arm is provided with an arc surface intervening with the left rail in the lower part, and a card stopping surface is arranged at the inner side of the arc surface; the guide shaft contacts and drives the arc surface to drive the compression bar turning around clockwise, after the guide shaft passes through the arc surface, the compression-bar reset spring drives the compression bar turning around counterclockwise, and the guide shaft is stuck against the card stopping surface to form a locking state; the right arm is provided with a shaft pressing surface in the lower part for suppressing the compression shaft in the unlocking operation.

7. The apparatus for receiving and dispensing cards automatically of claim 6, wherein the right panel is provided with a stopping plate for stopping the compression bar from turning around counterclockwise in the locking state.

8. The apparatus for receiving and dispensing cards automatically of claim 1, wherein the card receiving and dispensing main body further comprises a card receiving box inserted and mounted within the card receiving and dispensing main body; the card receiving box comprises a card receiving box body, a card inlet arranged on the card-receiving box body, and a card receiving gate mechanism for opening and closing the card inlet.

9. The apparatus for receiving and dispensing cards automatically of claim 8, wherein the apparatus further comprises a card-receiving gate closing mechanism for driving the card-receiving gate mechanism to close the card inlet; the card-receiving gate closing mechanism comprises a box hook mounted on the left panel or the right panel of the card receiving and dispensing main body, and a stopping part arranged at an inner side of the box hook; when the card receiving box is removed, the box hook is hooked with the card-receiving gate of the card-receiving gate mechanism, and the stopping part presses toward the sidewall of the card receiving box; after the card-receiving gate is closed completely, the stopping part arrives at the end of the card receiving box and then leave away from it, the card-receiving gate drives the box hook to rotate and being released.

10. The apparatus for receiving and dispensing cards automatically of claim 9, wherein the stopping part is provided with a rotary roller for reducing friction.

11. The apparatus for receiving and dispensing cards automatically of claim 1, wherein the apparatus further comprises a card receiving mechanism; the card receiving mechanism is arranged on the card receiving and dispensing main body and comprises a bracket arranged on one side panel, rails mounted on both the bracket and the panel, a supporting shaft sliding mounted on the rails, a pull-back hook fixed on the supporting shaft, a wretch mounted on one end of the supporting shaft which stretches out of the panel, and a reset spring with two ends fixed on the panel and the supporting shaft respectively; at least one section of the rails are inclined upward from the card outlet of the card dispensing box in a direction away to the card outlet; at an initial position, the reset spring pulls the supporting shaft to be on a highest point of the rails, at the moment, location of the pull-back hook is higher than that of the card outlet.

12. The apparatus for receiving and dispensing cards automatically of claim 1, wherein the apparatus further comprises a card-dispensing vibration damping mechanism; the card dispensing vibration damping mechanism comprises a driving wheel driven by a motor and fixed on the card receiving and dispensing main body, a card transporting wheel opposite to the driving wheel and rotatably mounted on the card receiving and dispensing main body by the supporting shaft, and a spring for suppressing the card transporting wheel to contact with the driving wheel; the card transporting wheel can be lifted up, by the card and be driven by the spring to remain a tendency to move toward the driving wheel.

13. The apparatus for receiving and dispensing cards automatically of claim 8, wherein the apparatus further comprises a card box theftproof mechanism; the card box theftproof mechanism comprises a gate spindle fixed on the card receiving and dispensing main body, a security gate mounted on the gate spindle in a rotary way, a cam lock arranged on the security gate, and a lock hole arranged on the sidewall of one side panel of the card receiving and dispensing main body; the card dispensing box and the card receiving box are enclosed within the card receiving and dispensing main body by the security gate.

14. The apparatus for receiving and dispensing cards automatically of claim 2, wherein the apparatus further comprises a card shutter closing mechanism for driving the card shutter locking mechanism to close the card shutter.

15. The apparatus for receiving and dispensing cards automatically of claim 14, wherein the card shutter closing mechanism comprises a guide shaft arranged on one side of the card dispensing box body, a compression shaft arranged on the other side of the card shutter and extending out of the card dispensing box body, and a pair of rails arranged on the card receiving and dispensing main body; the rails comprises a left rail arranged on a left panel of the card receiving and dispensing main body and a right rail arranged on a right panel of the card receiving and dispensing main body, and the two rails are arranged separately but opposite to each other; the guide shaft is inserted into the left rail, and the compression shaft is inserted into the right rail; the right rail is provided with a protrusion for stopping the compression shaft from moving downward; the left rail comprises at least one stopping section corresponding to the protrusion.

16. The apparatus for receiving and dispensing cards automatically of claim 14, wherein the card shutter closing mechanism comprises a compression bar rotatably mounted on the card receiving and dispensing main body, and a compression bar reset spring for driving the compression bar to reset; the compression bar comprises a left arm and a right arm respectively mounted on the left panel and the right panel by shafts, and a handle across the left panel and right panel for linking the left arm with the right arm; the compression-bar reset spring is mounted between the left panel and the left arm; the left arm is provided with an arc surface intervening with the left rail in the lower part, and a card stopping surface is arranged at the inner side of the arc surface; the guide shaft contacts and drives the arc surface to drive the compression bar turning around clockwise, after the guide shaft passes through the arc surface, the compression-bar reset spring drives the compression bar turning around counterclockwise, and the guide shaft is stuck against the card stopping surface to form a locking state; the right arm is provided with a shaft pressing surface in the lower part for suppressing the compression shaft in the unlocking operation.

17. The apparatus for receiving and dispensing cards automatically of claim 16, wherein the right panel is provided with a stopping plate for stopping the compression bar from turning around counterclockwise in the locking state.

* * * * *